US007228351B2

(12) United States Patent
Arwe

(10) Patent No.: US 7,228,351 B2
(45) Date of Patent: Jun. 5, 2007

(54) METHOD AND APPARATUS FOR MANAGING RESOURCE CONTENTION IN A MULTISYSTEM CLUSTER

(75) Inventor: John E. Arwe, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 10/334,203

(22) Filed: Dec. 31, 2002

(65) Prior Publication Data

US 2004/0128385 A1 Jul. 1, 2004

(51) Int. Cl.
*G06F 15/173* (2006.01)

(52) U.S. Cl. .................................. 709/226; 718/104
(58) Field of Classification Search ................ 709/229, 709/225, 221, 226; 710/220; 707/8; 713/201; 718/104

See application file for complete search history.

(56) References Cited

U.S. PATENT DOCUMENTS

| | | | |
|---|---|---|---|
| 5,339,427 A | | 8/1994 | Elko et al. |
| 5,444,693 A | | 8/1995 | Arslan et al. |
| 5,561,784 A | | 10/1996 | Chen et al. |
| 5,706,276 A | | 1/1998 | Arslan et al. |
| 5,719,868 A | | 2/1998 | Young |
| 5,805,900 A | * | 9/1998 | Fagen et al. ................ 710/220 |
| 6,038,651 A | | 3/2000 | VanHuben et al. |
| 6,189,007 B1 | * | 2/2001 | Boonie et al. .................. 707/8 |
| 6,330,612 B1 | * | 12/2001 | Boonie et al. .............. 709/229 |
| 6,338,112 B1 | * | 1/2002 | Wipfel et al. ............... 710/269 |
| 6,442,564 B1 | | 8/2002 | Frey et al. |
| 6,681,242 B1 | * | 1/2004 | Kumar et al. ................ 718/104 |
| 6,732,166 B1 | * | 5/2004 | Woodruff ..................... 709/221 |
| 7,047,299 B1 | * | 5/2006 | Curtis ......................... 709/225 |

(Continued)

FOREIGN PATENT DOCUMENTS

EP WO 00/76129 A1 6/2000

OTHER PUBLICATIONS

Michael Lo and Sivarama P. Dandamudi, Performance of Hierarchical Load Sharing in Heterogeneous Distributed Systems, Proceedings of the ISCA International Conference, Parallel And Distributed Computing Systems, Dijon, France, Sep. 25-27, 1996, ISBN: 8-880843-17-X, vol. I of II, pp. 370-377.

(Continued)

*Primary Examiner*—Jungwon Chang
(74) *Attorney, Agent, or Firm*—William A. Kinnaman, Jr.

(57) ABSTRACT

A method and apparatus for managing contention among users for access to serialized resources in a system cluster containing multiple systems. Each user has an assigned need that is independent of contention of the user for a resource and may be either a holder or a waiter for a resource it is seeking to access. A local system stores local cluster data indicating a grouping of the resources into local clusters on the basis of contention on the local system and indicating for each local cluster the assigned need of a waiter for resources in the cluster. The local system receives remote cluster data from remote systems in the system cluster, which it combines with the local cluster data to generate composite cluster data. A holder on the local system of a resource in a composite cluster is managed in accordance with the composite cluster data for the cluster.

20 Claims, 11 Drawing Sheets

U.S. PATENT DOCUMENTS

2002/0161869 A1* 10/2002 Griffin et al. ............... 709/221
2004/0088573 A1* 5/2004 Jeyaram .................... 713/201

OTHER PUBLICATIONS

Silvia M. Figueira and Francine Berman, Modeling the Slowdown of Data-Parallel Applications in Homogeneous and Heterogeneous Clusters of Workstations, Seventh Heterogeneous Computing Workshop (HCW '98), Mar. 30, 1998, Orlando, Florida, U.S.A.

"Priority Inheritance Protocols: An Approach to Real-Time Synchronization", by L. Sha et al, IEEE Transactions on Computers 39 (Sep. 1990), No. 9, pp. 1175-1185.

"Priority Inheritance and Ceilings for Distributed Mutual Exclusion", by F. Mueller, IEEE Real-Time Systems Symposium, Dec. 1-3, 1999, pp. 340-349.

Serialization Locks in a Share-Nothing Multiple Node RDBMS, Research Disclosure, Jan. 1999, International Business Machines Corporation, pp. 127-128.

Silvia M. Figueira and Francine Berman, A Slowdown Model for Applications Executing on Time-Shared Clusters of Workstations, IEEE Transactions on Parallel and Distributed Systems, vol. 12, No. 6, Jun. 2001, pp. 653-655.

IBM Technical Disclosure Bulletin, vol. 26, No. 1, Jun. 1983, Resource Class Independent Deadlock Detection, pp. 434-435.

John E. Arwe, Method And Apparatus For Managing Resource Contention, New Utility Patent Application filed with the USPTO on Dec. 31, 2002.

* cited by examiner

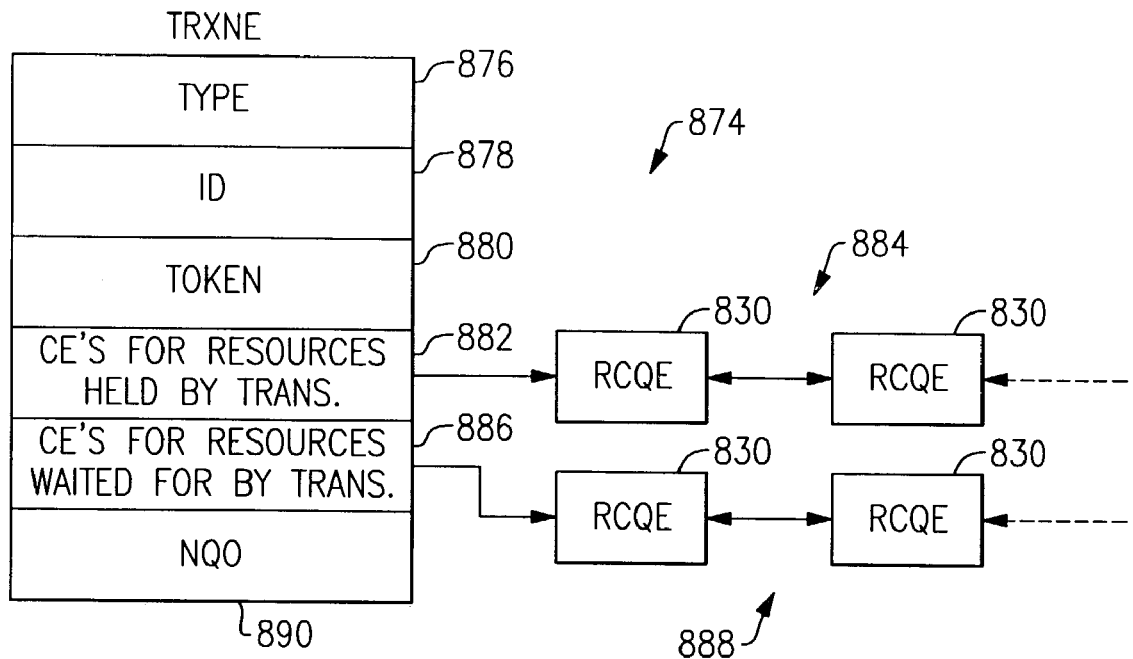
FIG.8G
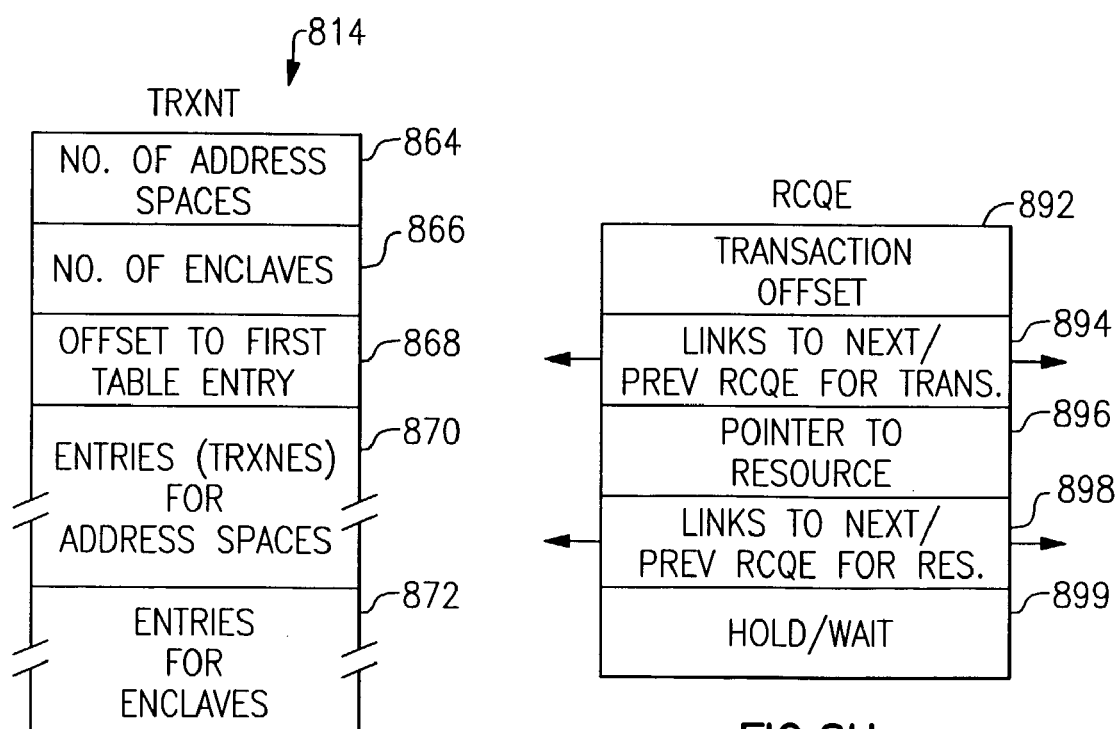
FIG.8F
FIG.8H

METHOD AND APPARATUS FOR MANAGING RESOURCE CONTENTION IN A MULTISYSTEM CLUSTER

CROSS-REFERENCE TO RELATED APPLICATION

This application is related to the commonly owned, concurrently filed application of the same inventor, Ser. No. 10/33,046, entitled "Method and Apparatus for Managing Resource Contention", incorporated herein by reference.

BACKGROUND OF THE INVENTION

1. Field of the Invention

This invention relates to a method and apparatus for managing contention among users for access to serialized resources in an information handling system. More particularly, it relates to a method and apparatus for managing such contention in a system cluster containing a plurality of such systems.

2. Description of the Related Art

Resource contention is a well-known phenomenon in information handling systems. It occurs when a user (e.g., a process or other unit of work) attempts to access a resource that is already held by another user, and the access requested by the second user is inconsistent with that of the first user. This will occur, for example, if either user is requesting exclusive access to the resource in question. Resource managers are software components that manage contention among competing requesters for a resource that they control by granting one or more such users access to the resource as a holder and placing any remaining users in a pool of waiters until the resource becomes available.

In a computer operating system such as the IBM z/OS™ operating system, with multiple resource managers and multiple units of work, resource contention management is a complex problem.

Contention chains can form, or put another way, contention can cross resources. For example, job A waits on resource R1 but holds R2, while job B holds R1 but is waiting for R3, which in turn is held by job C. Contention can cross systems. In the example above, each job could be on a separate system. Contention can cross resource managers. For example, R1 could be a GRS enqueue and R2 could be a DB2™ latch. The global resource serialization (GRS) component of z/OS manages enqueues, while the IMS™ Resource Lock Manager (IRLM) manages the DB2 resources separately.

Cross-resource contention is typically solved within a single resource manager (e.g. GRS) by tracking the topology of each resource's holders and waiters and finding any points of intersection. Cross-system contention is typically solved by making the resource manager aware of the entire cluster's data (managing the cluster as one unit rather than as independent systems). Cross-resource manager contention is typically "solved" by having a reporting product query all of the interfaces and correlate the data as if it were a virtual resource manager. Because the problem is of order $O(2^n)$ in the number of resources in contention, it is also computationally complex.

The base MVS™ component of z/OS has a simple efficiency solution (known popularly as "enqueue promotion"): automatically (and temporarily) boost the CPU and MPL access of any work holding a resource reportedly in contention, with no attention paid to the neediness of the work. This is equivalent to managing a holder as if there were "important" waiter(s) for a resource, regardless of the actual topology. To appreciate the operation of this, consider the following example. Suppose that:

1. Job A holds resource R1.
2. Job B holds resource R2 and waits for R1.
3. Job C waits for R2.

Notationally, this can be represented as a chain C→B→A, where the capital letters represent the jobs, and the symbol "→" (the "link" in the chain) indicates that the job on the left of the symbol is waiting for a resource held by the job on the right of the symbol. Thus, the above chain means that job C is waiting for a resource held by job B, which in turn is waiting for a resource held by job A.

Assuming these are GRS resources, the conventional MVS implementation would help jobs A and B because they hold resources under contention, promoting each equally and for a limited time. Helping B would do no good, however, since B is in fact waiting for A. If B is itself multitasking, then the help may actually harm competing work without doing anything about the resource contention.

SUMMARY OF THE INVENTION

One aspect of the invention, which is the subject of the concurrently filed application identified above, comprises a method and apparatus for managing contention among users for access to resources in an information handling system in which each user has an assigned need and may be either a holder or a waiter for a resource it is seeking to access. In accordance with this aspect of the invention, a user is identified that is not a waiter at a head a chain of users in which each user having a next user in the chain is holding a resource for which the next user is waiting. That user at the head of the chain is managed as if its need were at least that of the neediest waiter in the chain, preferably by allocating system resources to the user as if its need were at least that of such neediest waiter.

Preferably, and as an independent inventive feature of this aspect of the invention, such a contention chain is identified by identifying a cluster of resources in which each resource in the cluster is either held by a user that is waiting for another resource in the cluster or being waited for by a user that is holding another resource in the cluster and determining the need of a neediest waiter for any resource in the cluster. A user is identified that is a holder of a resource in the cluster but is not waiting for any other resource, and that holder of the resource is managed as if its need were at least that of the neediest waiter for any resource in the cluster, again preferably by allocating system resources to the user as if its need were at least that of such neediest waiter.

The step of identifying a cluster is preferably performed in response to receiving a notification of a change in the contention status of a resource. Thus, a resource is newly assigned to a cluster if it is now being held by a user that is waiting for another resource in the cluster or being waited for by a user that is holding another resource in the cluster. On the other hand, a resource is removed from a cluster if it is no longer being held by a user that is waiting for another resource in the cluster or being waited for by a user that is holding another resource in the cluster.

This aspect of the invention thus contemplates integration of the "neediness" factor into the base system resource allocation mechanism so that a job at the head of a chain (e.g., job A above, with a neediness factor of 4) can be run as if it had the neediness factor of a needier job elsewhere on the chain (e.g. job C above, with a need of 1) until it releases the resource.

Integrating the concept of neediness into the previous example, one can better appreciate how it behaves differently. Suppose that:
1. Job A, with a "need" of 4, holds resource R1. (In this specification, lower numbers signify a greater need, so they can be thought of as "priority for helping".)
2. Job B, with a need of 5, holds resource R2 and waits for R1.
3. Job C, with a need of 1, waits for R2.

Notationally, this can be represented as a chain C(1)→B(5)→A(4), where the capital letters represent the jobs, the numbers in parentheses represent the "need" of those jobs, and the symbol "→" (the "link" in the chain) indicates that the job on the left of the symbol is waiting for a resource held by the job on the right of the symbol. Thus, the above chain means that job C, with a need of 1, is waiting for a resource held by job B, with a need of 5, which in turn is waiting for a resource held by job A, with a need of 4.

Use of the "neediness" factor in this manner confers several advantages that may not be apparent. First, it avoids helping work like B above because we understand that B is also waiting for another resource, thus avoiding an action that is at best useless and at worst damaging to unrelated competing work. Second, it gives a system resource allocator the knowledge to allow it to help A more than it otherwise would, and indefinitely rather than only for a limited time. While the conventional implementation would ignore the chain and treat both A and B as "important" for some limited period of time, with the invention it is understood that A really has a need of 1, or "most important", for as long as C is waiting. Third, it gives a system resource allocator the knowledge to allow it to abstain from helping holder(s) at the head of the chain if it wishes, for example if the neediest work in the network is the current holder.

This first aspect of the invention may be practiced either on a single system or in a system cluster containing a plurality of such systems. The variant of this invention that identifies resource clusters is especially suited for use in a multisystem implementation, as it requires an exchange of only a subset of the local contention data, as described below.

Another aspect of the invention, which is the subject of the present application, contemplates a protocol for managing resource allocation across multiple systems while passing very little data around, of order O(n) in the number of multisystem resources in contention.

This other aspect of the invention, which incorporates aspects of the single-system invention described above, contemplates a method and apparatus for managing contention among users for access to resource in a system cluster containing a plurality of systems, each user having an assigned need and being capable of being either a holder or a waiter for a resource it is seeking to access. In accordance with this aspect of the invention, each such system, operating as a local system, stores local cluster data indicating a grouping of the resources into local clusters on the basis of contention on the local system and indicating for each local cluster a need for one or more resources in the local cluster. Each system also receives remote cluster data from other systems in the system cluster, operating as remote systems, indicating for each such remote system a grouping of the resources into remote clusters on the basis of contention on the remote system and indicating for each remote cluster a need for one or more resources in the remote cluster. Each local system combines the local cluster data and the remote cluster data to generate composite cluster data indicating a grouping of the resources into composite clusters on the basis of contention across the systems and indicating for each composite cluster a need for one or more resources in that composite cluster. Each local system then uses this composite cluster data to manage holders on the local system of resources in the composite clusters.

Preferably, the local, remote and composite cluster data indicates the need of the neediest waiter for any resource in the cluster in question, and holders on the local system of resources in the composite clusters are managed by identifying such holders that are not waiting for any other resource and allocating system resources to such holders as if their need were at least that of a neediest waiter for any resource in the corresponding composite cluster.

Preferably, each local system assigns a pair of resources to a common local cluster if a user on the local system is holding one of the resources while waiting for the other of the resources, and updates the local cluster data in response to receiving a notification of a change in the contention status of a resource with regard to a user on the local system. Each local system also transmits its local cluster data, including any updates, to the remote systems, which, treating the transmitted cluster data as remote cluster data relative to the receiving systems, then update their composite cluster data accordingly. The transmitted local cluster data indicates a resource, a cluster to which the resource is assigned on the basis of contention on the local system, and a need on the local system for the resource.

Using partial data (not the full resource topology) from each participating resource manager instance in the cluster, and a measure of "neediness", it is possible for each system individually to understand if the neediest waiter for a resource (including any waiters in the transitive closure of cross—"everything above" resources) is needier than any holder of the resource at the head of the chain. The system can then allocate resources to such holder(s) as if their measure of neediness were no less needy than of the neediest blocked piece of work.

The protocol passes around only one set of information per resource, instead of the full list of holders and waiters from each system, so that no system has a complete view of contention across the cluster. The data itself consists only of: a cluster-unique resource name, the neediness value of the neediest waiter on the sending system, and a sending-system-unique token. If the latter token matches for two resources, then their management must be integrated (the tokens are assigned based on the sending system's local data only). The protocol also sends only data about resources in contention, even if some of the pieces of work in the topology hold other resources not in contention. The sending system cluster information can be encoded in various ways. Thus, rather than sending a token based only on local contention on the sending system, the local system can, as in a preferred embodiment, send a cluster name based upon remote contention as well, together with an indication of whether a non-trivial cluster assignment (i.e., an assignment to a cluster containing more than one resource) is based upon local or remote information.

The invention is preferably implemented as part of a computer operating system or as "middleware" software that works in conjunction with such operating system. Such a software implementation contains logic in the form of a program of instructions that are executable by the hardware machine to perform the method steps of the invention. The program of instructions may be embodied on a program storage device comprising one or more volumes using semiconductor, magnetic, optical or other storage technology.

BRIEF DESCRIPTION OF THE DRAWINGS

FIGS. 8A–8H show the various data structures for storing contention data in one embodiment of the present invention.

DESCRIPTION OF THE PREFERRED EMBODIMENTS

Figure 1:
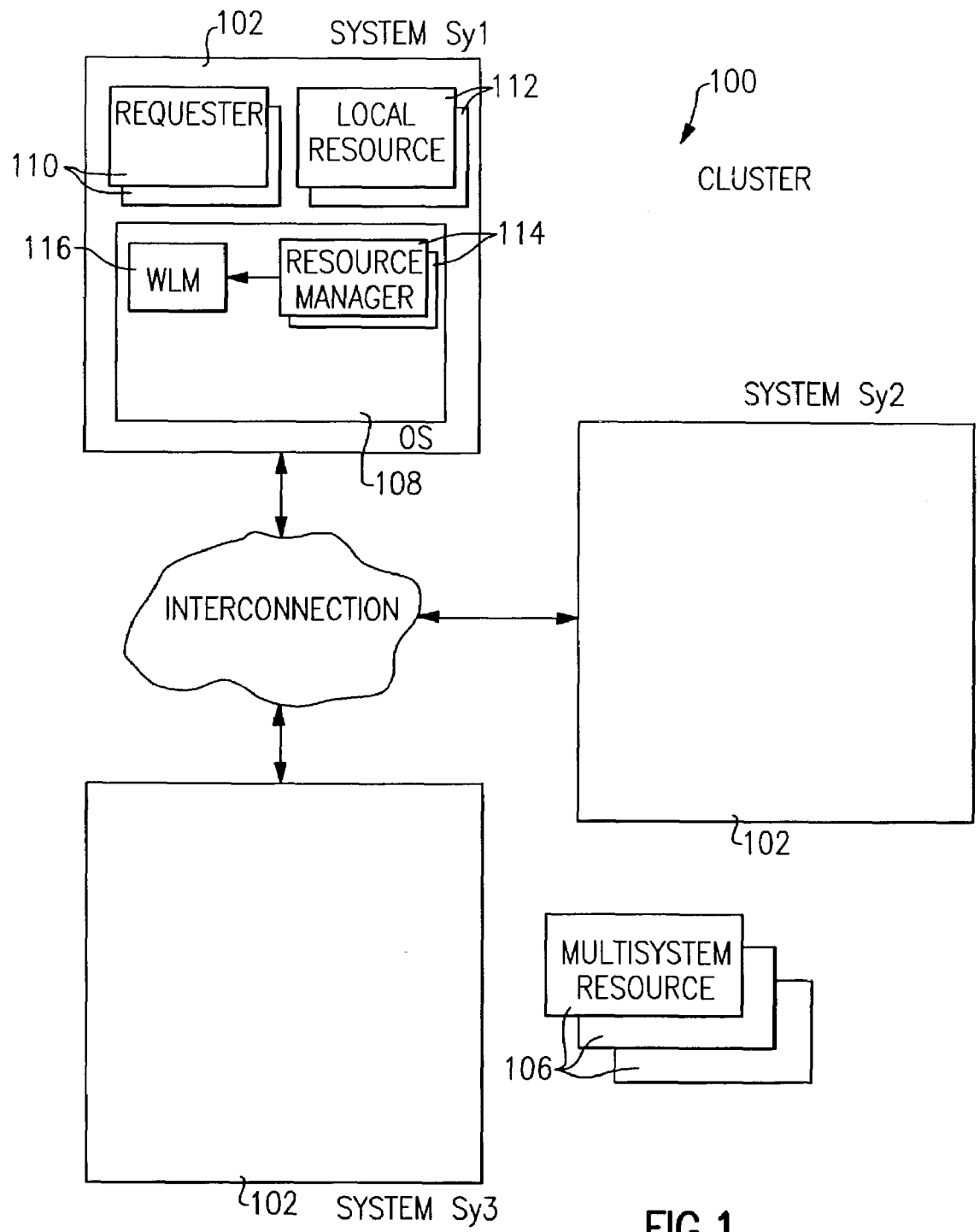
FIG. 1 shows a computer system cluster incorporating the present invention.

FIG. 1 shows a computer system cluster 100 incorporating the present invention. Cluster 100 contains individual systems 102 (Sy1, Sy2, Sy3) coupled together by an interconnection 104 of any suitable type. Although an exemplary three systems are shown, the invention is not limited to any particular number of systems. Cluster 100 has one or more global or multisystem resources 106 that are contended for by requesters from the various systems.

Each system 102 of the cluster may comprise either a separate physical machine or a separate logical partition of one or more physical machines. Each system contains an operating system (OS) 108 that performs the usual functions of providing system services and managing the use of system resources in addition to performing the functions of the present invention. Although the invention is not limited to any particular hardware or software platform, preferably each system 102 comprises an instance of the IBM z/OS operating system running on an IBM zSeries™ server or a logical partition of such server.

Each system 102 contains one or more requesters 110 that contend among each other for access to multisystem resources 106 and, optionally, local resources 112 that are available only to requesters on the same system. A requester 110 may comprise any entity that contends for access to resources 106 or 112 and is treated as a single entity for the purpose of allocating system resources.

(The system resources that are allocated to requesters 110 should be distinguished from the resources 106 and 112 that are the subjects of contention among the requesters. System resources are allocated to requesters 110 in a manner that is usually transparent to the requesters themselves to improve some performance-measure such as throughput or response time. The resources 106 and 110, on the other hand, are explicitly requested by the requesters as part of their execution. Where it is necessary to distinguish them, the latter class of resources will sometimes be referred to using a term such as "serialized resources" or the like.)

Each operating system 108 contains several components of interest to the present invention, including one or more resource managers 114 and a workload manager (WLM) 116.

Each resource manager 114 manages contention among competing requesters 110 for a resource 106 or 112 that it controls by granting access by one or more such requesters to the resource as a holder and placing any remaining requesters in a pool of waiters until the resource becomes available. Although the invention is not limited to any particular resource manager, one such resource manager (used for multisystem resources 106) may be the Global Resource Serialization (GRS) component of the z/OS operating system, described in such references as the IBM publication *z/OS MVS Planning: Global Resource Serialization*, SA22-7600-02 (March 2002), incorporated herein by reference. Further, while the resource managers 114 are depicted as being part of the operating system 108 (as GRS is a part of z/OS), other resource managers (such as IRLM) may exist independently of the operating system.

Workload manager (WLM) 116 allocates system resources to units of work (which may be address spaces, enclaves, etc.) on the basis of a "need" value that is assigned to that unit of work (or the service class to which it belongs) and reflects in some sense the relative priority of that unit of work relative to other units of work being processed. Although the invention is not limited to any particular workload manager, one such workload manager is the workload management component of the IBM z/OS operating system, described in such references as the IBM publications *z/OS MVS Planning: Workload Management*, SA22-7602-04 (October 2002), and *z/OS MVS Programming: Workload Management Services*, SA22-7619-03 (October 2002), both of which are incorporated herein by reference. Such a workload management component works in conjunction with a system resources manager (SRM) component of the IBM z/OS operating system, as described in such references as the IBM publication *z/OS MVS Initialization and Tuning Guide*, SA22-7591-01 (March 2002), especially chapter 3 (pages 3–1 to 3–84), incorporated herein by reference. Since the particular manner in which these components interact is not a part of the present invention, both components are assumed to be referenced by the box 116 labeled "WLM" in FIG. 1.

Neither the particular manner in which a need value is assigned to a user nor the manner in which system resources are allocated to a user on the basis of an assigned need value is a part of the present invention. Any of a number of techniques well known in the art could be used for either. Preferably, the need value should be one that has a similar meaning across the system cluster. In the embodiment shown it is a calculated dynamic value, based on the active WLM policy, that integrates resource group limits and importance into a single quantity that can be safely compared across systems. While the ordering is arbitrary, in this description lowers numbers represent higher need or priority, so that a user with a need of 1 is "needier" than a user with a need of 5.

FIGS. 2A–2D show various contention chains that may develop among the resources 106 and 112 in the system cluster 100. These chains are known more formally as directed graphs, but the chain terminology will be used herein. Each link in these chains, depicted by an arrow, represents a relationship where a user (represented by a node at the tail of the arrow) is waiting for a resource held by another user (represented by a node at the head of the arrow). The "transitive closure" of such a relationship is the chain formed by including all such relationships involving any node of the chain so that if one follows the arrows, all nodes eventually point to a holder that is not waiting for any resources in contention and thus stands at the head of the chain. (Whether a chain can have more than one head is discussed below in the description of FIG. 2D.)

Figure 2A:
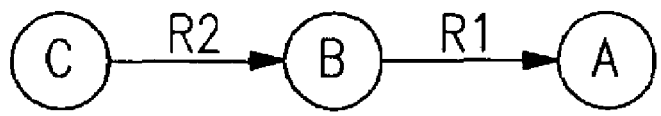
FIGS. 2A–2D show various types of contention chains.

FIG. 2A shows the contention scenario described in the background and summary portions above, in which a user C is waiting for a resource R2 held by a user B who is in turn waiting for a resource R1 held by a user A. As disclosed herein, user A, who is a holder but not a waiter and therefore at the head of the chain, is allocated system resources as if its need were at least that of the neediest of the waiters B and C, since both of its waiters will benefit from having A finish with the resource R1. User B is also a-holder, but is not given this preferential allocation since it is waiting for a resource and therefore not running; thus, there would be no point at this time in allocating more resources to B (although there may be later when B acquires resource R1 as a holder).

The contention scenario shown in FIG. 2A is a straight chain, in which each user is holding and/or waiting for a resource held by a single user. In general, however, contention chains can be branched, so that a single user may be holding a resource waited for by multiple users or waiting for resources held by multiple users. Some resources can also be requested for shared access, allowing multiple concurrent holders.

Figure 2B:
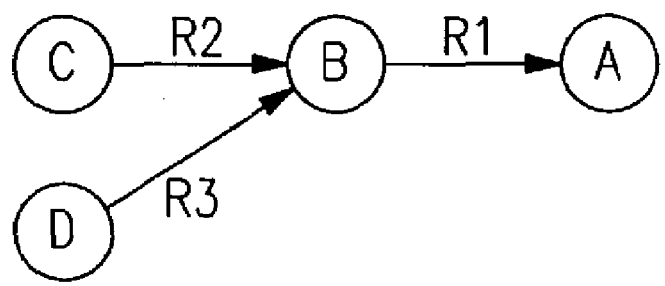

FIG. 2B shows a contention scenario with branching of the first type, which differs from the scenario shown in FIG. 2A in that now an additional user D is waiting for a resource R3 held by user B. Here, user A is allocated system resources as if its need were at least that of the neediest of the waiters B, C and D, since all of these waiters will benefit from having A finish with the resource R1.

Figure 2C:
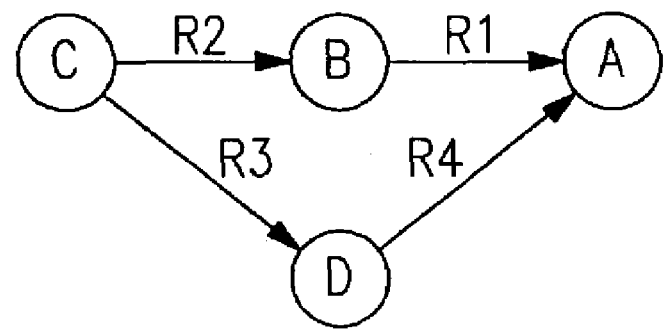

FIG. 2C shows a contention scenario with branching of both types, which differs from the scenario shown in FIG. 2A in that now user C is waiting for an additional resource R3 controlled by a user D, who is waiting for a resource R4 controlled by user A. Here again, user A is allocated system resources as if its need were at least that of the neediest of the waiters B, C and D, since all of these waiters will benefit from having A finish with the resource R1.

Figure 2D:
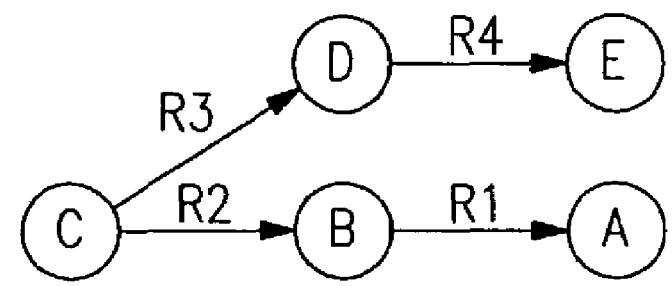

Finally FIG. 2D shows a contention scenario with branching of the second type, which differs from the chain shown in FIG. 2A in that now user C is also waiting for a resource R3 held by user D, who in turn is waiting for a resource R4 held by user E. Theoretically, this could be analyzed as two partially overlapping chains each having one head, one chain being C→B→A and the other chain being C→D→E. In the first chain, user A is allocated system resources as if its need were at least that of the neediest of the waiters B and C, while in the second chain, user E is allocated system resources as if its need were at least that of the neediest of the waiters C and D.

Figure 3:
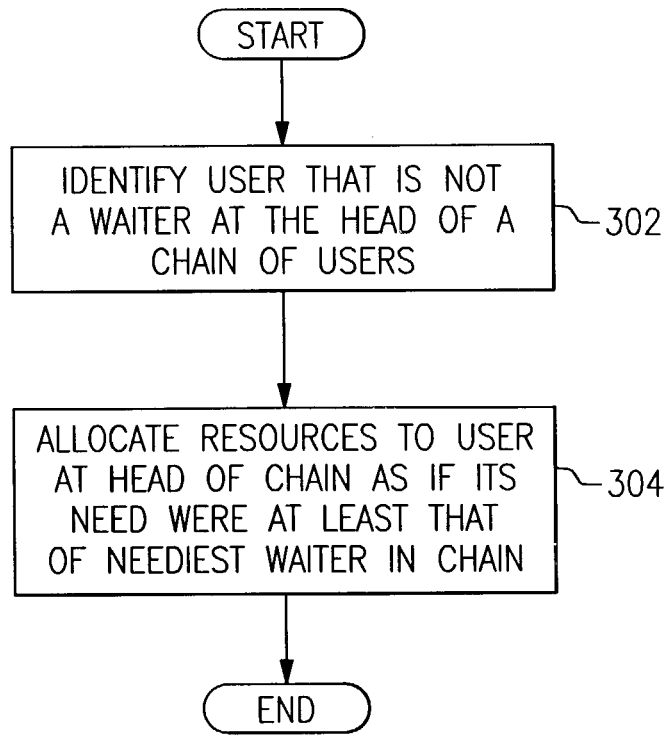
FIG. 3 shows procedure for allocating resources to a user at the head of a chain of contention.

Summarizing this, referring to FIG. 3, in an ideal implementation one would first identify a user that is not a waiter at a head a chain of users in which each user having a next user in the chain is holding a resource for which the next user is waiting (step 302). In FIG. 2D this would be user A for the chain consisting of users A–C and user E in the chain consisting of users C–E. One would then allocate system resources to the user at the head of the chain as if its need were at least that of that neediest waiter in that chain (step 304). That is to say, if there were such a neediest waiter with a need greater than that of the user at the head of the chain, that user would be allocated system resources on the basis of the need of such waiter if that need were greater than that of the user.

In this treatment as two chains, user A's resource allocation does not depend on the need of user D, since user D's branch (proceeding in the direction of the arrows) does not feed into user A, and user D would thus not stand to benefit from favoring user A. Nor, for similar reasons, does user E's resource allocation depend on the need of user B. Accordingly, in a preferred embodiment, these chains (or rather the resources constituting the links in these chains) are analyzed as two separate resource clusters: a first containing resources R1–R2 and a second containing resources R3–R4. In the first cluster, user A is allocated system resources as if its need were at least that of the neediest of the waiters (B and C) for any of the resources (R1 and R2) in that first cluster. Similarly, in the second cluster, user E is allocated system resources as if its need were at least that of the neediest of the waiters (C and D) for any of the resources (R3 and R4) in that second cluster.

In all of the above examples, the contention chains are acyclic, meaning that one cannot form a closed path by following the links along the directions of their arrows. If there were such a closed path, there would be a resource deadlock, which could only be broken by terminating one or more of the users involved in the deadlock.

Figure 4:
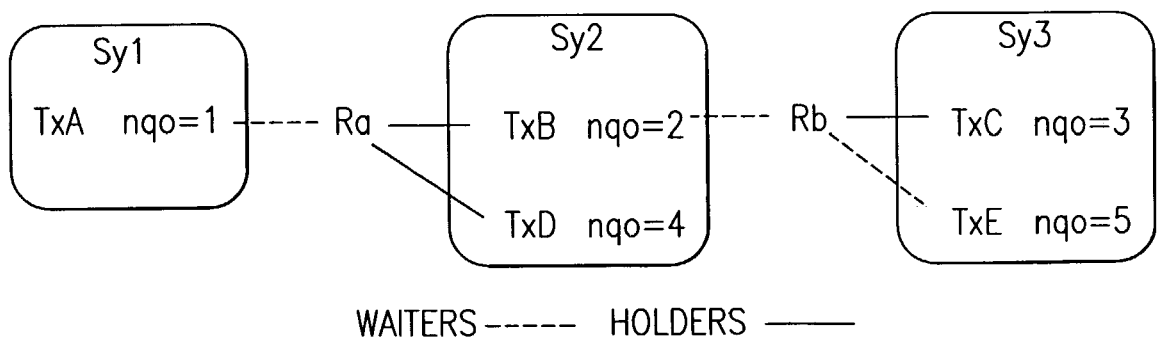
FIG. 4 shows a typical contention scenario among transactions and resources on several systems.

Turning now to the details of a multisystem implementation, FIG. 4 shows a typical contention scenario among transactions and resources on several systems. In the figure, a transaction TxA (with a need of 1) on system Sy1 is waiting for a resource Ra held by transactions TxB (with a need of 2) and TxD (with a need of 4) on system Sy2. Transaction TxB on system Sy2 is in turn waiting for a resource Rb held by transaction TxC (with a need of 3) on system Sy3, as is transaction TxE (with a need of 5) on system Sy3.

In this example, we will look at system Sy2 as illustrating how the systems Sy1–Sy3 manage contention. In accordance with one aspect of this invention, system Sy2 does not store or maintain a complete global picture of contention in the cluster, but rather a subset of such contention information as indicated in the following table.

| | | System Sy2 | | | |
|---|---|---|---|---|---|
| | | Local system info | | Remote waiter info | |
| Resource Cluster | Resource Name | Holders | Waiters | System name | NQO | NQO |
| Cab | Ra | TxB(2), TxD(4) | | Sy1 | 1 | 1 |
| Cab | Rb | | TxB(2) | Sy3 | 5 | 2 |
| Cab | cluster | Ra, Rb linked | | | | 1 |

As shown in the above table, system Sy2 stores a complete set of contention data ("local system info") for its local transactions TxB and TxD that are contending for resources either as holders or as waiters. For each such resource for which a local transaction is in contention, Sy2 tracks the local holders and waiters, including their intrinsic "need" values. System Sy2 has also assigned resources Ra and Rb to a common cluster Cab, since at least one local transaction (TxB) is both a holder of one requested resource (Ra) and a waiter for another requested resource (TxB).

The data shown in the above table or otherwise tracked by a local instance of WLM (either by storing it as such or by deriving it as needed from other data) includes local cluster data, remote cluster data, and composite cluster data. Local cluster data indicates the grouping of the resources into local clusters on the basis of contention on the local system and, for each such local cluster, the need of the neediest waiter for any resource in the local cluster. Similarly, remote cluster data indicates, for a particular remote system, the grouping of the resources into remote clusters on the basis of contention on the remote system and, for each such remote cluster, the need of the neediest waiter for any resource in the remote cluster. Finally, composite cluster data, generated by combining the corresponding local and remote data, indicates the grouping of the resources into composite clusters on the basis of contention across the systems and, for each such composite cluster, the need of the neediest waiter for any resource in the composite cluster.

In the above table, items under the caption "Local system info" represent local cluster data, since they are based only on local contention in the sense of a local user waiting for a resource or holding a resource under contention. The need of the neediest local waiter for a resource can be ascertained by looking in the "Waiters" column under "Local system info". Thus for resource Ra there is no local waiter (and hence no "neediest" local waiter), while for resource Rb the neediest waiter (TxB) has a need of 2. The grouping of the resources into clusters on the basis of local contention is not explicitly shown in the table, but may be derived by looking for pairs of resource entries where a local user is holding one resource while waiting for the other. Thus, in the above table, the listing of user TxB as a holder of resource Ra and a waiter for resource Rb means that resources Ra and Rb are assigned to a common cluster on the basis of local contention data.

Similarly, the items under the caption "Remote waiter info" represent remote cluster data, since they are based only on contention on particular remote systems. For each remote system listed for a resource in the "System name" column, the need of the neediest waiter is indicated in the adjacent "NQO" column. The grouping of resources into clusters on the basis of contention data from a particular remote system is not indicated in the above table, but is tracked by the local WLM instance so that it can be combined with the local cluster assignment information to obtain a composite cluster assignment. Combining of clusters is done in a straightforward manner. Thus, if a first system assigns resources A and B to a common cluster (on the basis of its local contention data), a second system similarly assigns resources B and C to a common cluster, and a third system assigns resources C and D to a common cluster, the resulting composite cluster contains resources A, B, C and D.

On the other hand, the first column ("Resource Cluster") represents composite cluster data, since its assignment of a resource to a cluster is based both on local cluster data and remote cluster data. The final column ("NQO") likewise represents composite cluster data, since the need listed is that of the neediest waiter for the resource across all systems (as reported to the local system).

System Sy2 could store the contention data in the tabular form shown above, but more typically would distribute such across data a number of data structures to optimize the ease of manipulation, as described further below.

Figure 5:
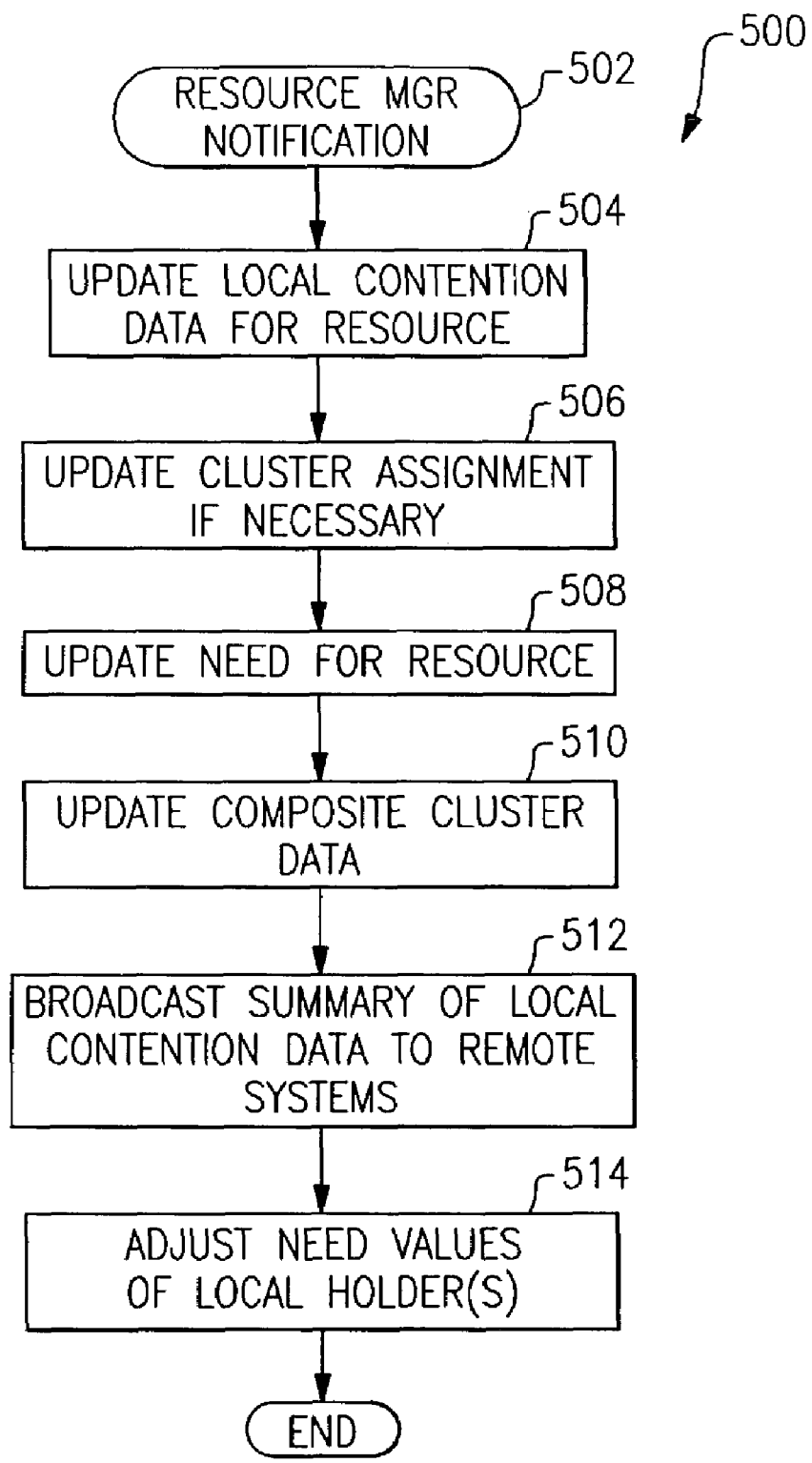
FIG. 5 shows the general procedure followed in response to a notification from a local resource manager.

FIG. 5 shows the general procedure 500 followed by a local instance of WLM in response to a contention notification from a local resource manager. Although a particular sequence of steps is described, the sequence may be varied as long as the necessary input data is available when each step is performed.

The procedure 500 begins when the WLM instance receives a notification from a local resource manager of a change in the contention state of a resource as it relates to local users. Such a change may signify any of the following:
1. A local user has become a waiter for a resource held by another user.
2. A local user is no longer a waiter for a resource. This may be either because it has acquired the resource as a holder or because it is no longer interested in the resource as either a holder or a waiter (possibly because it has terminated and therefore no longer exists, as described in an example below).
3. A resource held by a local user is now in contention.
4. A resource held by a local user is no longer in contention.

The notification from the local resource manager would identify the resource as well as the local holders and waiters. In a preferred embodiment, WLM obtains the respective "needs" of these holders and waiters (their intrinsic needs, not their needs as altered in accordance with the present invention) from the SRM component not separately shown; the particular source of this data, though, forms no part of the present invention.

In response to receiving such a notification from a resource manager instance, the local instance of WLM first updates the local contention data for the resource in question (step 504). Such updating can include creating a new entry for a resource newly in contention on the local system, modifying an existing entry for a resource already in contention on the local system, or deleting an existing entry for a resource no longer in contention on the local system. This local contention data includes an identification of any local user holding or waiting for the resource, together with the "need" of such user.

After updating the local contention data, the local instance of WLM updates the resource's cluster assignment if necessary (step 506). By default, a resource is assigned to a trivial cluster that contains only itself as a member. A resource is assigned to a non-trivial cluster containing at least one other resource if such assignment is dictated either by local contention data or by remote contention data. A resource is assigned to a cluster containing another resource on the basis of local contention data if that data indicates that the same local user is holding one of the resources while waiting for the other—that is, that the resource is either held by a user that is waiting for the other resource or being waited for by a user that is holding the other resource. A resource is assigned to a cluster containing another resource on the basis of remote contention data if that data indicates that at least one remote system has assigned the two resources to a common cluster on the basis of contention data that is local to that remote system. This cluster assignment step may thus involve: (1) leaving the cluster assignment for the resource unchanged; (2) newly assigning the resource to a non-trivial cluster if the changed local contention data and any existing remote contention data dictate such assignment; or (3) breaking up an existing cluster if the changed local contention data and any existing remote contention data no longer dictate such assignment. If the resource's cluster assignment is changed, the cluster information for the other resources affected by the change is similarly modified at this time.

Concurrently, the local instance of WLM updates an imputed "need" value for the resource that is based only upon local contention data for the resource (step 508). This imputed need is the greatest of the needs of any local waiter for the resource, as indicated by the local contention data for the resource. Although this step is shown as following the cluster assignment step, the order of the steps is immaterial, since neither step uses the results of the other.

At some point after it has updated the cluster assignment and the imputed need value for the resource, the local instance of WLM updates its composite cluster data, which includes: (1) an imputed need value for the resource, based upon both local and remote contention data (the "NQO"

column in the above table); (2) a grouping of the resources into a composite cluster, based upon local and remote contention data; and (3) an imputed "need" value for the resource cluster as a whole (step 510). The last named is simply the greatest of the needs of any of the resources making up the composite cluster, where here as well the need is based upon remote as well as local contention data for the resources making up the cluster.

The local instance of WLM then broadcasts a summary of its updated local contention data to the other systems in the cluster (step 512). This data summary includes:

1. The local system name.
2. The resource name. If the resource is a multisystem resource, the resource name is the actual name of the resource as recognized across the cluster. If the resource is a local resource, the resource name is a generic local resource name serving as a "proxy" for the actual local resource name, as described in Example 2 below.
3. A cluster ID identifying the cluster to which the resource is assigned. This value is strictly local; the receiving system compares this value to see if two resources belong to the same cluster on the sending system, but does not make any assumptions about the structure or contents of this value. In the examples below, the cluster name is given as a concatenation of the multisystem resources in the cluster, purely as a mnemonic device to facilitate reader comprehension. However, in the preferred embodiment, the "cluster name" is actually an opaque "cluster ID" that receiving systems can only test for equality with other cluster IDs originating on the same sending system.
4. The "need" for the resource based solely on the sending system's "local system information"—i.e., the neediest local waiter for the resource. This may be considered as a vote of what this system thinks the need should be if only its data were being considered. If there is no local waiter for the resource, then a dummy value indicating that there is no local need is transmitted, as described in Example 1 below.
5. An indication of whether any transaction on the sending system forces the resource to be included in the cluster, i.e., whether the resource is being assigned to a non-trivial cluster based upon local contention data. This is a boolean value, but rather than yes/no it will be given values of local/remote in this description. Local means: (1) that the sending system has at least one transaction that is both a waiter for one resource and a holder of another resource; and (2) that the same transaction is either a waiter or a holder for this resource (thus the sending system requires the group of resources connected with the transaction(s) to be managed as a group). Remote means that nothing in the sending system's local data requires that the resource be part of a non-trivial cluster. Trivial clusters have exactly one resource, and always have a value of 'remote' to make the clustering code a bit easier.

If there has been a cluster reassignment, WLM also broadcasts similar information for each other resource affected by the reassignment.

Finally, the local WLM instance makes any necessary adjustments to the "need" values of local users (step 514). More particularly, WLM adjusts the "need" of any local holder of a resource that is not also a waiter for another resource (and thus is at the head of a contention chain) so that it at least matches the intrinsic need of the neediest waiter in the cluster containing the resource. The adjusted value is the imputed "need" value that is actually used to allocate system resources to the holder, not the intrinsic need value that is assigned to that user (and used to impute values to other users). Thus, if the reason for imputing a particular need value goes away, the need value imputed to a user reverts either to the intrinsic need value or to a lesser imputed need value.

Figure 6:
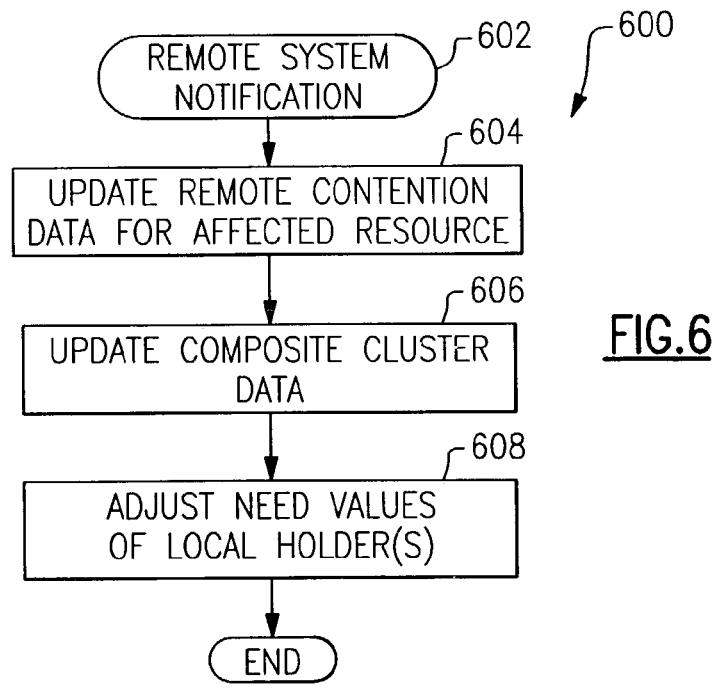
FIG. 6 shows the general procedure followed in response to receiving a broadcast of contention data from a remote system.

FIG. 6 shows the general procedure 600 followed by a local instance of WLM in response to receiving a broadcast of remote contention data from an WLM instance on a remote system (step 602). This broadcast includes, for each affected resource, the information listed in the description of step 512.

In response to receiving such a notification, the local instance of WLM first updates the remote contention data for the resource in question (step 604). As with the updating of local contention data described in step 304, such updating can include creating a new entry for a resource newly in contention on the local system, modifying an existing entry for a resource already in contention on the local system, or deleting an existing entry for a resource no longer in contention on the local system. This remote contention data includes an identification of any remote system having a waiter for the resource, together with the need of the neediest such waiter on the remote system for the resource.

After updating its remote contention data for the resource, the local instance of WLM updates its composite cluster data for the resource, as it did in step 510. As in step 510, the composite cluster updated includes: (1) an imputed need value for the resource, based upon both local and remote contention data; (2) a grouping of the resources into a composite cluster, based upon local and remote contention data; and (3) an imputed "need" value for the resource cluster as a whole, based upon local and remote contention data (step 606).

Finally, as in step 514, the local WLM instance makes any necessary adjustments to the "need" values of local users by adjusting the "need" of any local holder of a resource that is not also a waiter for another resource (and thus is at the head of a contention chain) so that it at least matches the intrinsic need of the neediest waiter in the cluster containing the resource (step 608).

Detailed examples and scenarios follow:

EXAMPLE 1

"Simple" Transitive Closure Case

This example is a cross-system transitive closure case: more than one resource is involved, and an unneedy user holding one resource is helped in order to get another (needy) user waiting on a different resource moving. The topology is multisystem, with holders and waiters for the same resource on different systems.

This shows what happens when only multisystem resources are involved in the same resource cluster, so it is a "simple" transitive closure case.

Notation in this example is as follows. Each holder and waiter is a transaction (Txn, e.g. TxA, TxB) and has an NQO (eNQueue Order) value. NQO values are such that smaller values are needier (more deserving of help). Each system is numbered (Sy1, Sy2), and all of these systems are in the same "system cluster". Each resource has a lowercase letter (Ra, Rb) and is multisystem in scope. Each resource cluster has one or more lowercase letters (Ca, Cab) showing the list of resources in the cluster. Requests to obtain resources are for exclusive control unless otherwise noted.

The sequence of events, in time order, is as follows:

| Time (t) | Event |
| --- | --- |
| 1 | No contention. |
| 2 | Sy1: TxB acquires Ra. |
| 3 | Sy2: TxC acquires Rb. |
| 6 | Sy1: TxB requests Rb and is suspended since TxC holds it. |
| 7 | Sy2: TxA requests Ra and is suspended since TxB holds it. |
| 10 | Sy2: TxC releases Rb. |
| 11 | Sy1: TxB is resumed and acquires Rb. |
| 12 | Sy1: TxB releases Rb. |
| 13 | Sy1: TxB releases Ra. |
| 14 | Sy2: TxA is resumed and acquires Ra (no contention). |

For t<6, there is no contention so there is no WLM contention data on either system.

At t=6, contention develops (Sy1: TxB requests Rb and is suspended since TxC holds it). As a result, Sy1:

1. Begins tracking contention for resource Rb.
2. Creates a resource cluster consisting only of Rb.
3. Adds TxB to the local waiter list for Rb.

At this point the state on Sy1 is as follows:

System Sy1

| Resource Cluster | Resource Name | Local system info | | Remote waiter info | |
| --- | --- | --- | --- | --- | --- |
| | | Holders Waiters | | System name NQO | NQO |
| Cb | Rb | TxB(4) | | | |

When Sy1 next reevaluates its resource topology, it calculates the NQO for Cb.

1. Since the neediest entity involved in the topology for Rb that Sy1 knows about (in fact, the only one at this point) is TxB, it uses TxB's NQO (4) as the NQO for Rb.
2. Having calculated the NQO for all resources in Cb, it calculates the NQO for Cb as the neediest of all resource NQO's in Cb. This propagates the NQO of 4 from Rb to Cb.
3. Since Rb is a multisystem resource, Sy1 broadcasts Rb's information to all other systems in the system cluster. As described above, the information sent for Rb includes the system name, the resource name, the cluster ID, the NQO for the resource based solely on the sending system's "local system information", and a boolean value (local/remote) that when set to "local" indicates that a transaction on the sending system forces the resource to be included in the cluster.
4. Based on the explanation above, the data sent is: Sy1, Rb, Cb, 4, remote.

At this point the state on Sy1 is as follows:

System Sy1

| Resource Cluster | Resource Name | Local system info | | Remote waiter info | |
| --- | --- | --- | --- | --- | --- |
| | | Holders Waiters | | System name NQO | NQO |
| Cb | Rb | TxB(4) | | | 4 |

Sy2 receives this information; concurrently, the resource manager instance running on Sy2 notifies Sy2 of contention on Rb. The order of operations is irrelevant, but they will be listed in the order previously described. The only "trick" in the code is that if the resource manager on Sy2 wins the race, when the remote data arrives the code must recognize that it already has an equivalent cluster built and add the remote information to its existing data.

After receiving the remote information from Sy1, the state on Sy2 is as follows:

System Sy2

| Resource Cluster | Resource Name | Local system info | | Remote waiter info | |
| --- | --- | --- | --- | --- | --- |
| | | Holders Waiters | | System name NQO | NQO |
| Cb | Rb | | | Sy1 4 | |

Once Sy2's local resource manager notifies Sy2 of the contention on Rb, the states on Sy1 and Sy2 are as follows:

System Sy1

| Resource Cluster | Resource Name | Local system info | | Remote waiter info | |
| --- | --- | --- | --- | --- | --- |
| | | Holders Waiters | | System name NQO | NQO |
| Cb | Rb | TxB(4) | | | 4 |

System Sy2

| Resource Cluster | Resource Name | Local system info | | Remote waiter info | |
| --- | --- | --- | --- | --- | --- |
| | | Holders Waiters | | System name NQO | NQO |
| Cb | Rb | TxC(5), | | Sy1 4 | 4 |

Note that the local NQO on Sy2 for Rb is 4, not 5, which is TxC's NQO. First, the NQO(s) of resource holders never influence the resource's NQO; since the holder is running, WLM's policy adjustment code is already using the NQO implicitly. Second, Sy2 now knows that somewhere else in the system cluster a transaction with an NQO of 4 is waiting; since 4 is defined as being needier than 5, the NQO for Rb must be no less needy than 4.

Figure 7A:
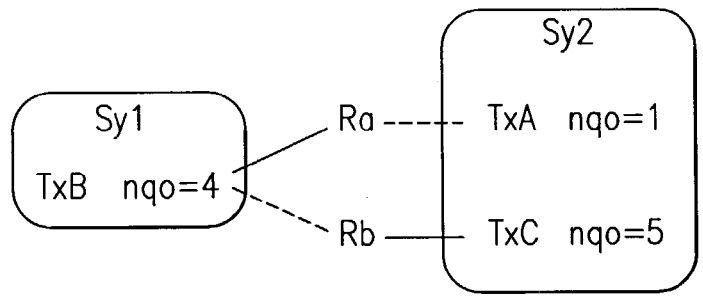
FIGS. 7A–7G show the multisystem contention state in various examples of operation.

At t=7, contention develops on another resource (Sy2: TxA requests Ra and is suspended since TxB holds it). FIG. 7A shows the topology after t=7.

Since resource Ra also has a multisystem scope, this results in a similar bit of hand-shaking as just occurred for Rb, with the resulting state:

System Sy1

| Resource Cluster | Resource Name | Local system info | | Remote waiter info | |
| --- | --- | --- | --- | --- | --- |
| | | Holders Waiters | | System name NQO | NQO |
| Ca | Ra | | | Sy2 1 | 1 |
| Cb | Rb | TxB(4) | | | 4 |

| | | System Sy2 | | | | |
|---|---|---|---|---|---|---|
| Resource | Resource | Local system info | | Remote waiter info | | |
| Cluster | Name | Holders | Waiters | System name | NQO | NQO |
| Ca | Ra | | TxA(1) | | | 1 |
| Cb | Rb | TxC(5) | | Sy1 | 4 | 4 |

Once the resource manager instance on Sy1 informs Sy1 of contention on Ra, Sy1 makes the crucial step of linking Ca and Cb into a (new) cluster Cab. After simply being informed of the contention on Ra, a valid (but so far incomplete) state might be (depends on the code implementation whether these are two discrete steps or one integrated step, they are shown discretely):

| | | System Sy1 | | | | |
|---|---|---|---|---|---|---|
| Resource | Resource | Local system info | | Remote waiter info | | |
| Cluster | Name | Holders | Waiters | System name | NQO | NQO |
| Ca | Ra | TxB(4), | | Sy2 | 1 | 1 |
| Cb | Rb | | TxB(4) | | | 4 |

When Sy1 next reevaluates its topology, it knows based on local information that a single transaction (TxB) is involved with two different resources (Ra and Rb), and therefore the management of those resources must be integrated (in other words, Ra and Rb must be in the same resource cluster Cab). The NQO of the cluster is the neediest NQO of its member resources (1 in this case).

| | | System Sy1 | | | | |
|---|---|---|---|---|---|---|
| Resource | Resource | Local system info | | Remote waiter info | | |
| Cluster | Name | Holders | Waiters | System name | NQO | NQO |
| Cab | Ra | TxB(4), | | Sy2 | 1 | 1 |
| Cab | Rb | | TxB(4) | | | 4 |
| Cab | cluster | Ra & Rb linked | | | | 1 |

The "signal" that Ra and Rb must be managed together is the presence of at least one transaction that is both holding one or more resources under contention and waiting on one or more other resources under contention.

After reevaluating its view of the topology, Sy1 (as before) broadcasts its view to other systems in the cluster.
1. Sy1, Ra, Cab, dummy NQO value, local.
2. Sy1, Rb, Cab, 4, local.

The dummy NQO value is simply one that is less needy than anything WLM could ever generate.

Sy1 has no purely local NQO value since it has no local waiters, but it does need to send out the "virtual message" that Ra and Rb must be managed as a unit based on its local data.

Sy2 integrates the data (including the fact that Ra and Rb must be managed as a unit, meaning that Ca and Cb must be merged), yielding the following.

| | | System Sy2 | | | | |
|---|---|---|---|---|---|---|
| Resource | Resource | Local system info | | Remote waiter info | | |
| Cluster | Name | Holders | Waiters | System name | NQO | NQO |
| Cab | Ra | | TxA(1) | | | 1 |
| Cab | Rb | TxC(5) | | Sy1 | 4 | 4 |
| Cab | cluster | | | Sy1: Ra & Rb linked | | 1 |

Now both systems agree on the importance of the problem (i.e. the neediest waiter's NQO value), even though neither has a copy of the complete topology.

At t=10, the contention begins to unwind (Sy2: TxC releases Rb). Sy2's view of Rb now contains only remote data.

| | | System Sy1 | | | | |
|---|---|---|---|---|---|---|
| Resource | Resource | Local system info | | Remote waiter info | | |
| Cluster | Name | Holders | Waiters | System name | NQO | NQO |
| Cab | Ra | TxB(4) | | Sy2 | 1 | 1 |
| Cab | Rb | | TxB(4) | | | 4 |
| Cab | cluster | Ra & Rb linked | | | | 1 |

| | | System Sy2 | | | | |
|---|---|---|---|---|---|---|
| Resource | Resource | Local system info | | Remote waiter info | | |
| Cluster | Name | Holders | Waiters | System name | NQO | NQO |
| Cab | Ra | | TxA(1) | | 1 | 1 |
| Cab | Rb | | | Sy1 | 4 | 4 |
| Cab | cluster | | | Sy1: Ra & Rb linked | | 1 |

At t=11, the resource manager instance on Sy1 finds out that Rb is available and gives it to the first waiter on its queue (Sy1: TxB is resumed and acquires Rb). Since the resource manager's wait queue is now empty, it notifies WLM to indicate that Rb's contention has ended. Sy1 removes Rb from its resource cluster, since within each system any single resource can only belong to a single cluster (although two systems might have the same resource in different clusters due to timing windows).

| | | System Sy1 | | | | |
|---|---|---|---|---|---|---|
| Resource | Resource | Local system info | | Remote waiter info | | |
| Cluster | Name | Holders | Waiters | System name | NQO | NQO |
| Ca | Ra | TxB(4) | | Sy2 | 1 | 1 |

In parallel, the resource manager instance on Sy2 is told that Rb is no longer being contended for (depending upon the resource manager implementation, this might have occurred as early as t=10), and it also removes Rb from its resource topology.

| System Sy2 | | | | | |
|---|---|---|---|---|---|
| Resource | Resource | Local system info | | Remote waiter info | |
| Cluster | Name | Holders | Waiters | System name NQO | NQO |
| Ca | Ra | TxA(1) | | | 1 |

At t=12, there is no change since the resource released is no longer in contention (Sy1: TxB releases Rb).

At t=13, contention unwinds completely (Sy1: TxB releases Ra). The resource manager instance on Sy1 notifies WLM to signal the end of Ra's contention.

| System Sy1 | | | | | |
|---|---|---|---|---|---|
| Resource | Resource | Local system info | | Remote waiter info | |
| Cluster | Name | Holders | Waiters | System name NQO | NQO |

At t=14, Sy2 sees the end of contention as well (Sy2: TxA is resumed and acquires Ra (no contention)). The resource manager instance on Sy2 notifies WLM to signal the end of Ra's contention.

| System Sy2 | | | | | |
|---|---|---|---|---|---|
| Resource | Resource | Local system info | | Remote waiter info | |
| Cluster | Name | Holders | Waiters | System name NQO | NQO |

EXAMPLE 2

Transitive Closure Case with Local Resources

This example is another cross-system transitive closure case: more than one resource is involved, and an unneedy user holding one resource must be helped in order to get another (needy) user waiting on a different resource moving. The topology is again multisystem, with holders and waiters for the same resource on different systems. In addition, and in contrast to Example 1, each system has contention involving the same transactions on purely local (non-multisystem) resources. This shows what happens when both multisystem and single system resources are involved in the same resource cluster.

Notation is the same as in Example 1, except that multisystem resources use a capital R (Ra, Rb) while local resources use a lowercase r (rc, rd). Rlocal (=RL) is a proxy name for "some unknown set of resources which are local in scope to a remote system". The actual value is irrelevant, the only requirement being that all participants agree to the value and that it not be allowed to collide with any valid resource name.

The sequence of events, in time order, is as follows:

| Time (t) | Event |
|---|---|
| 1 | No contention. |
| 2 | Sy1: TxB acquires Ra. |
| 3 | Sy2: TxC acquires Rb. |
| 4 | Sy1: TxB acquires rl. |
| 5 | Sy2: TxA acquires rj. |
| 6 | Sy1: TxB requests Rb and is suspended since TxC holds it. |
| 7 | Sy2: TxA requests Ra and is suspended since TxB holds it. |
| 8 | Sy1: TxS requests rl and is suspended since TxB holds it. |
| 9 | Sy2: TxT requests rj and is suspended since TxA holds it. |
| 10 | Sy2: TxC releases Rb. |
| 11 | Sy1: TxB is resumed and acquires Rb. |
| 12 | Sy1: TxB releases Rb. |
| 13 | Sy1: TxB releases Ra. |
| 14 | Sy2: TxA is resumed and acquires Ra (no multisystem contention). |
| 15 | Sy1: TxB releases rl. |
| 16 | Sy1: TxS is resumed and acquires rl. |
| 17 | Sy2: TxA releases rj. |
| 18 | Sy2: TxT is resumed and acquires rj. |

For t<8, the contention state on each system is exactly the same as in Example 1 and will therefore not be described here.

At t=8, contention develops on a local (non-multisystem) resource rl (Sy1: TxS requests rl and is suspended since TxB holds it). Resource rl is integrated into the resource cluster on Sy1 only. The NQO for rl is 3, from TxS, but the cluster Cabl still has an NQO of 1 because of Ra.

| System Sy1 | | | | | |
|---|---|---|---|---|---|
| Resource | Resource | Local system info | | Remote waiter info | |
| Cluster | Name | Holders | Waiters | System name NQO | NQO |
| Cabl | Ra | TxB(4) | | Sy2    1 | 1 |
| Cabl | Rb | | TxB(4) | | 4 |
| Cabl | Rl | TxB(4) | TxS(3) | | 3 |
| Cabl | cluster | Ra, Rb, rl linked | | | 1 |

When Sy1 broadcasts its view of the cluster, it will not broadcast rl directly since Ra and Rb are the only resources in the cluster that might be visible to other systems. Instead it will broadcast a proxy (Rlocal) for all of Sy1's local resources (which we know to be only rl).

1. Sy1, Ra, Cabl, dummy NQO value, local.
2. Sy1, Rb, Cabl, 4, local.
3. Sy1, Rlocal, Cabl, 3, local.

After receiving this data and updating its topology, Sy2 believes this to be the state.

| System Sy2 | | | | | |
|---|---|---|---|---|---|
| Resource | Resource | Local system info | | Remote waiter info | |
| Cluster | Name | Holders | Waiters | System name NQO | NQO |
| CabL | Ra | | TxA(1) | | 1 |
| CabL | Rb | TxC(5) | | Sy1    4 | 4 |
| CabL | Rlocal | | | Sy1    3 | 3 |
| CabL | cluster | | | Sy1: Ra, Rb, Rlocal linked | 1 |

Figure 7B:
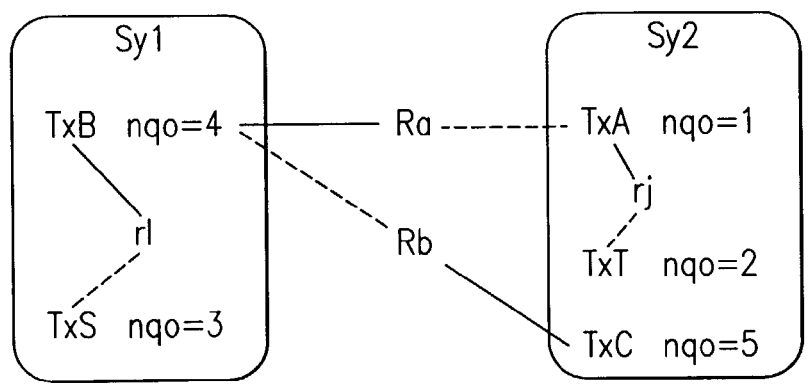

At t=9, another local resource shows contention on the other system (Sy2: TxT requests rj and is suspended since TxA holds it). FIG. 7B shows the topology after t=9.

Similar processing occurs on Sy2 as just did on Sy1, and then Sy2 broadcasts its data to Sy1. Sy2 broadcasts the following:

1. Sy2, Ra, CabL, 1, local.
2. Sy2, Rb, CabL, dummy NQO value, remote.
3. Sy2, Rlocal, CabL, 2, local.

In the above broadcasts, the name of the proxy for local resources on Sy2 is implicitly qualified by the cluster name since, as noted below, a proxy is defined for each resource cluster, not just for the system cluster as a whole. Also, only the broadcasts for Ra and Rlocal contain the boolean value "local", since only those two resources are assignable to a common cluster on the basis of local data.

System Sy1

| Resource Cluster | Resource Name | Local system info | | Remote waiter info | | |
|---|---|---|---|---|---|---|
| | | Holders | Waiters | System name | NQO | NQO |
| CablL | Ra | TxB(4) | | Sy2 | 1 | 1 |
| CablL | Rb | | TxB(4) | | | 4 |
| CablL | Rl | TxB(4) | TxS(3) | | | 3 |
| CablL | Rlocal | | | Sy2 | 2 | 2 |
| CablL | cluster | Ra, Rb, rl linked | | Sy2: Ra, Rb, Rlocal linked | | 1 |

System Sy2

| Resource Cluster | Resource Name | Local system info | | Remote waiter info | | |
|---|---|---|---|---|---|---|
| | | Holders | Waiters | System name | NQO | NQO |
| CabLj | Ra | | TxA(1) | | | 1 |
| CabLj | Rb | TxC(5) | | Sy1 | 4 | 4 |
| CabLj | Rlocal | | | Sy1 | 3 | 3 |
| CabLj | rj | TxA(1) | TxT(2) | | | 2 |
| CabLj | cluster | Ra, Rb, rj linked | | Sy1: Ra, Rb, Rlocal linked | | 1 |

There is no reason that one could not summarize all local resource contention by adding a "Sy2,2" entry to the "remote waiter info" for Rlocal on Sy2 or adding a dummy transaction to "local system info.waiters" on Sy2; the table above are shown without this optimization. It would probably make the broadcast code simpler to do have Rlocal summarize the local state data via one of the methods above; then Rlocal could be generated with a multisystem scope and no special cases in the broadcast code would be needed. There are other cases where it clearly would need to be special-cased. In fact one must allow one Rlocal per resource cluster, not merely one per system.

At t=10, the contention begins to unwind (Sy2: TxC releases Rb). Sy2's view of Rb now contains only remote data.

System Sy1

| Resource Cluster | Resource Name | Local system info | | Remote waiter info | | |
|---|---|---|---|---|---|---|
| | | Holders | Waiters | System name | NQO | NQO |
| CablL | Ra | TxB(4) | | Sy2 | 1 | 1 |
| CablL | Rb | | TxB(4) | | | 4 |
| CablL | rl | TxB(4) | TxS(3) | | | 3 |
| CablL | Rlocal | | | Sy2 | 2 | 2 |
| CablL | cluster | Ra, Rb, rl linked | | Sy2: Ra, Rb, Rlocal linked | | 1 |

System Sy2

| Resource Cluster | Resource Name | Local system info | | Remote waiter info | | |
|---|---|---|---|---|---|---|
| | | Holders | Waiters | System name | NQO | NQO |
| CabLj | Ra | | TxA(1) | | | 1 |
| CabLj | Rb | | | Sy1 | 4 | 4 |
| CabLj | Rlocal | | | Sy1 | 3 | 3 |
| CabLj | rj | TxA(1) | TxT(2) | | | 2 |
| CabLj | cluster | Ra, Rb, rj linked | | Sy1: Ra, Rb, Rlocal linked | | 1 |

At t=11, the resource manager instance on Sy1 finds out that Rb is available and gives it to the first waiter on its queue (Sy1: TxB is resumed and acquires Rb). Since the resource manager's wait queue is now empty, it notifies WLM to indicate that Rb's contention has ended. In parallel, the resource manager instance on Sy2 is told that Rb is no longer being contended for (depending upon the resource manager implementation, this might have occurred as early as t=10). Both systems must remove Rb from its resource cluster, since within each system any single resource can only belong to a single cluster. Two systems might have the same resource in different clusters at the same moment temporarily due to timing windows or permanently due to the resource topology. Examples of asymmetric topologies show up when more than two systems are involved.

System Sy1

| Resource Cluster | Resource Name | Local system info | | Remote waiter info | | |
|---|---|---|---|---|---|---|
| | | Holders | Waiters | System name | NQO | NQO |
| CalL | Ra | TxB(4) | | Sy2 | 1 | 1 |
| CalL | rl | TxB(4) | TxS(3) | | | 3 |
| CalL | Rlocal | | | Sy2 | 2 | 2 |
| CalL | cluster | Ra, rl linked | | Sy2: Ra, Rlocal linked | | 1 |

System Sy2

| Resource Cluster | Resource Name | Local system info | | Remote waiter info | | |
|---|---|---|---|---|---|---|
| | | Holders | Waiters | System name | NQO | NQO |
| CaLj | Ra | | TxA(1) | | | 1 |
| CaLj | Rlocal | | | Sy1 | 3 | 3 |

-continued

| | | System Sy2 | | | | |
|---|---|---|---|---|---|---|
| Resource | Resource | Local system info | | Remote waiter info | | |
| Cluster | Name | Holders | Waiters | System name | NQO | NQO |
| CaLj | rj | TxA(1) | TxT(2) | | | 2 |
| CaLj | cluster | Ra, rj linked | | Sy1: Ra, Rlocal linked | | 1 |

At t=12, there is no change since the resource released is no longer in contention (Sy1: TxB releases Rb).

At t=13, multisystem contention unwinds completely (Sy1: TxB releases Ra). The resource manager instance on Sy1 notifies WLM to signal the end of Ra's contention.

Since the resource cluster on Sy1 now consists only of local resources and the proxy for remote local resources involved in multisystem contention, the proxy can also be removed from the cluster. Since Sy2 has not been informed of the end of Ra's contention, it still maintains its proxy resource as part of the cluster.

| | | System Sy1 | | | | |
|---|---|---|---|---|---|---|
| Resource | Resource | Local system info | | Remote waiter info | | |
| Cluster | Name | Holders | Waiters | System name | NQO | NQO |
| Cl | rl | TxB(4) | TxS(3) | | | 3 |

| | | System Sy2 | | | | |
|---|---|---|---|---|---|---|
| Resource | Resource | Local system info | | Remote waiter info | | |
| Cluster | Name | Holders | Waiters | System name | NQO | NQO |
| CaLj | Ra | TxA(1) | | | | 1 |
| CaLj | Rlocal | | | Sy1 | 3 | 3 |
| CaLj | rj | TxA(1) | TxT(2) | | | 2 |
| CaLj | cluster | Ra, rj linked | | Sy1: Ra, Rlocal linked | | 1 |

At t=14, Sy2 sees the end of contention as well (Sy2: TxA is resumed and acquires Ra). The resource manager instance on Sy2 notifies WLM to signal the end of Ra's contention.

| | | System Sy2 | | | | |
|---|---|---|---|---|---|---|
| Resource | Resource | Local system info | | Remote waiter info | | |
| Cluster | Name | Holders | Waiters | System name | NQO | NQO |
| Cj | rj | TxA(1) | TxT(2) | | | 2 |

At t=15, contention on one of the local resources ends (Sy1: TxB releases rl) at TxS is resumed. Once the resource manager notifies Sy1 that contention on rl has ended, Sy1's topology is empty again.

At t=17, the last of the contention ends (Sy2: TxA releases rj) and TxT is resumed. Once the resource manager notifies Sy2 that contention on rl has ended, Sy2's topology is empty again.

EXAMPLE 3

Breaking a Cluster (BreakClu1)

This example involves breaking a resource cluster into smaller clusters without contention ending for any of the resources involved. The transaction linking Ra and Rb is cancelled, but since each resource has other waiters both resources are still in contention afterward. Notation is as in Example 1.

The sequence of events, in time order, is as follows:

| Time (t) | Event |
|---|---|
| 1 | No contention. |
| 2 | Sy1: TxD acquires Rb. |
| 3 | Sy2: TxA acquires Ra. |
| 4 | Sy1: TxD requests Ra and is suspended since TxA holds it. |
| 5 | Sy1: TxB requests Ra and is suspended since TxA holds it. |
| 6 | Sy1: TxE requests Rb and is suspended since TxD holds it. |
| 7 | Sy2: TxC requests Rb and is suspended since TxD holds it. |
| 8 | Sy1: TxD is cancelled by an operator or times out and is rolled back (cancelled). |

For t<4, there is no contention so there is no WLM contention data on either system.

Figure 7C:
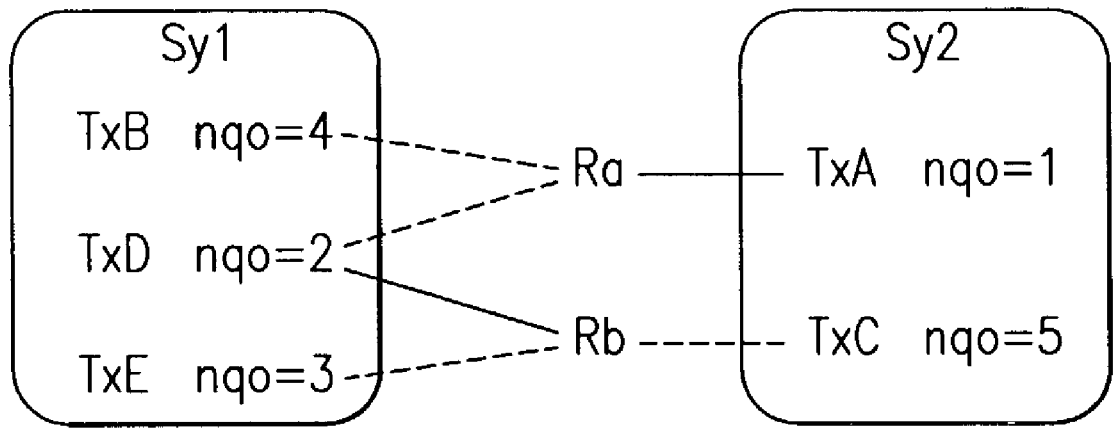

The events that occur between times t=4 and t=7 have been covered in earlier examples. FIG. 7C shows the topology after t=7. The state data at this point looks like this:

| | | System Sy1 | | | | |
|---|---|---|---|---|---|---|
| Resource | Resource | Local system info | | Remote waiter info | | |
| Cluster | Name | Holders | Waiters | System name | NQO | NQO |
| Cab | Ra | | TxB(4), TxD(2) | | | 2 |
| Cab | Rb | TxD(2) | TxE(3) | Sy2 | 5 | 3 |
| Cab | cluster | Ra, Rb linked | | | | 2 |

| | | System Sy2 | | | | |
|---|---|---|---|---|---|---|
| Resource | Resource | Local system info | | Remote waiter info | | |
| Cluster | Name | Holders | Waiters | System name | NQO | NQO |
| Cab | Ra | TxA(1) | | Sy1 | 2 | 2 |
| Cab | Rb | | TxC(5) | Sy1 | 3 | 3 |
| Cab | cluster | | | Sy1: Ra, Rb linked | | 2 |

When transaction TxD terminates at t=8 (for whatever reason), the resource manager instances on each system remove all wait requests TxD had outstanding (Ra) and release all resources that it held (Rb). Once WLM is informed of these topology changes, Sy1 knows that the resource cluster Cab should be broken into two pieces (Ca and Cb). It knows this because Sy1 locally decided that the two were linked (and can see that this is no longer true locally), and no remote system'data says that they must be linked. Both resources are however still in contention. The next time Sy1 broadcasts its topology data, the "Sy1: Ra, Rb linked" data on Sy2 is removed, and Sy2 also updates its topology. Assuming that WLM accomplishes all of this before the resource manager instances reassign ownership, the resulting state is:

| | | System Sy1 | | | | |
|---|---|---|---|---|---|---|
| | | Local | | Remote waiter info | | |
| Resource | Resource | system info | | | | |
| Cluster | Name | Holders | Waiters | System name | NQO | NQO |
| Ca | Ra | | TxB(4) | | | 4 |
| Cb | Rb | | TxE(3) | Sy2 | 5 | 3 |

| | | System Sy2 | | | | |
|---|---|---|---|---|---|---|
| | | Local | | Remote waiter info | | |
| Resource | Resource | system info | | | | |
| Cluster | Name | Holders | Waiters | System name | NQO | NQO |
| Ca | Ra | TxA(1) | | Sy1 | 4 | 4 |
| Cb | Rb | | TxC(5) | Sy1 | 3 | 3 |

So this implies that we have some mechanism to remove the "memory" of having to manage Ra and Rb together, rather than depending upon the end of contention for one of the resources involved. Some alternatives:

1. Sy1 explicitly sends data to indicate that it no longer believes a given resource cluster is necessary. For example, send: Ra, Ca, 4, remote. When Sy2 replaces Sy1's earlier data for Ra, it no longer sees any requirement to manage Ra and Rb together coming from Sy1; if Sy2 has no other "votes" to continue the cluster, Sy2 can break the cluster locally.

2. Sy1's data is aged (so it is deleted if not replaced "soon"). This would probably be implemented by sending a "time to live" (TTL) value, after which the data would be deleted by the recipient. This mechanism could provide a safety net for failed systems, lost signals, bugs, recovery problems, etc. as well. A TTL also has the advantage that it makes communication latency transparent and does not require the sender and receiver to agree on a common interval.

The most robust solution would probably be all three. Let the resource manager signaling end of contention globally handle the case where we delete the "Ra" block locally so we don't have to hold onto it long enough to send the "break the cluster" message. If contention for a resource ends locally but not remotely, and the local system was the one whose vote forced a non-trivial cluster to be built, let the TTL value cause the destruction of the cluster on the remote systems. If the cluster needs to be broken but contention did not end, we still have the "Ra" block and the "break the cluster" message is a natural consequence of what we would send anyway.

EXAMPLE 4

Breaking a Cluster (BreakClu2)

In this example, a resource cluster joined only by common holder(s) can be treated either as one resource cluster of "n" resources or as "n" clusters of one resource each. This result is surprising enough to be worth documenting.

Notation is as in Example 1.

The sequence of events, in time order, is as follows:

| Time (t) | Event |
|---|---|
| 1 | No contention. |
| 2 | Sy2: TxA acquires Ra and Rb. |
| 3 | Sy1: TxB requests Ra and is suspended since TxA holds it. |
| 4 | Sy1: TxC requests Ra and is suspended since TxA holds it. |
| 5 | Sy1: TxD requests Rb and is suspended since TxA holds it. |
| 6 | Sy1: TxE requests Rb and is suspended since TxA holds it. |

Figure 7D:
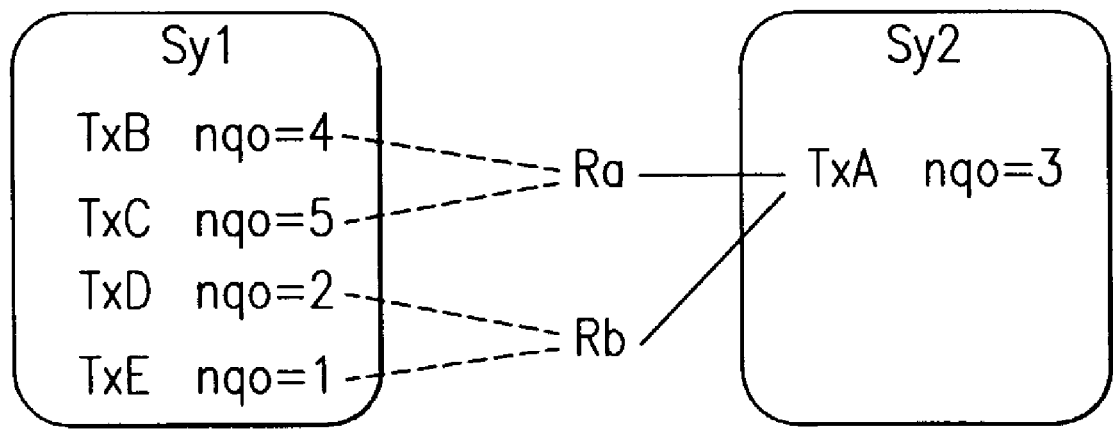

FIG. 7D shows the topology after t=6.

The events that occur up through t=6 have been covered in earlier examples. What is interesting here is that, depending upon how one defines things, one could treat this situation either as one resource cluster or two. If we use the definition from the earlier examples that a resource cluster can be identified by a system having the same transaction as a holder for one resource and as a waiter for a different resource (and then summing this knowledge up over all systems in the system cluster), then clearly the diagram above depicts two resource clusters rather than one as might be expected.

Since there is no value in forming the resource cluster Cab and there is overhead involved in doing so (more precisely, there is overhead involved when deciding if a cluster should be broken), this definition will continue to be used. Therefore the state data corresponding to the diagram above would be:

| | | System Sy1 | | | | |
|---|---|---|---|---|---|---|
| | | Local | | Remote waiter info | | |
| Resource | Resource | system info | | | | |
| Cluster | Name | Holders | Waiters | System name | NQO | NQO |
| Ca | Ra | | TxB(4), TxC(5) | | | 4 |
| Cb | Rb | | TxD(2), TxE(1) | | | 1 |

| | | System Sy2 | | | | |
|---|---|---|---|---|---|---|
| | | Local | | Remote waiter info | | |
| Resource | Resource | system info | | | | |
| Cluster | Name | Holders | Waiters | System name | NQO | NQO |
| Ca | Ra | TxA(3) | | Sy1 | 4 | 4 |
| Cb | Rb | TxA(3) | | Sy1 | 1 | 1 |

The assumption inherent with this definition is that when WLM attempts to help work that it will examine each resource and help the holder(s) as necessary based on the NQO values. If this topology were treated as a single resource cluster, TxA would inherit an NQO of 1 from the cluster Cab. Treating this as two clusters, WLM should conclude that 1. Ca needs no help because the holder's NQO of 3 is needier than the resource cluster's NQO of 4.

2. Cb needs help because the cluster NQO of 1 is needier than TxA's NQO of 3.

Since TxA ends up inheriting an NQO of 1 regardless of whether this scenario is treated as one or two resource clusters, we can choose either. Since managing two "trivial" (single resource) clusters is more efficient than a single composite cluster due to the tests for when the composite needs to be decomposed, this case is treated as two trivial resource clusters.

EXAMPLE 5

Simple Three-Way Scenario (3wayEasy)

This example is a simple three-system scenario. It is also a transitive closure case, but its asymmetric topology forces systems to track resources for which it has no local waiter/holder information coming from the resource manager. Notation is as in Example 1.

The sequence of events, in time order, is as follows:

| Time (t) | Event |
|---|---|
| 1 | No contention. |
| 2 | Sy2: TxB acquires Ra. |
| 3 | Sy3: TxC acquires Rb. |
| 4 | Sy1: TxA requests Ra and is suspended since TxB holds it. |
| 5 | Sy2: TxB requests Rb and is suspended since TxC holds it. |
| 6 | Sy3: TxC releases Rb. |
| 7 | Sy2: TxB acquires Rb. |
| 8 | Sy2: TxB finishes, releasing Ra and Rb. |
| 9 | Sy1: TxA acquires Ra. |

Figure 7E:
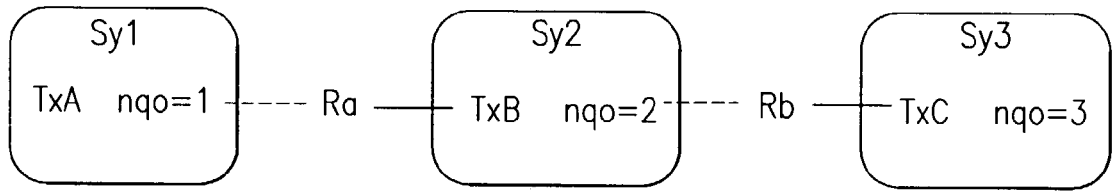

The events that occur up through t=5 have been covered in earlier examples. FIG. 7E shows the topology after t=5. The state data at this point is:

| | | System Sy1 | | | | |
|---|---|---|---|---|---|---|
| | | Local system info | | Remote waiter info | | |
| Resource Cluster | Resource Name | Holders | Waiters | System name | NQO | NQO |
| Ca | Ra | | TxA(1) | | | 1 |
| Cab | Rb | | | Sy2 | 2 | 2 |
| Cab | cluster | | | Sy2: Ra, Rb linked | | 1 |

| | | System Sy2 | | | | |
|---|---|---|---|---|---|---|
| | | Local system info | | Remote waiter info | | |
| Resource Cluster | Resource Name | Holders | Waiters | System name | NQO | NQO |
| Cab | Ra | TxB(2) | | Sy1 | 1 | 1 |
| Cab | Rb | | TxB(2) | | | 2 |
| Cab | cluster | Ra, Rb linked | | | | 1 |

| | | System Sy3 | | | | |
|---|---|---|---|---|---|---|
| | | Local system info | | Remote waiter info | | |
| Resource Cluster | Resource Name | Holders | Waiters | System name | NQO | NQO |
| Cab | Ra | | | Sy1 | 1 | 1 |
| Cab | Rb | TxC(3) | | Sy2 | 2 | 2 |
| Cab | cluster | | | Sy2: Ra, Rb linked | | 1 |

What is interesting here is that Sy3 has no involvement with Ra, yet it tracks at least some data about Ra in order to determine that TxC's NQO should be 1 (inherited from TxA on Sy1). This should not cause much hardship though: Sy1 and Sy2 do not know which other systems are involved with Ra, this is only "discoverable" after all systems have broadcast their latest topology data (which is, of course, a moving target). Thus Sy1 and Sy2 must broadcast their data anyway. The additional burden is that Sy3 must bookkeep the summary data it receives from its peers, but as long as it stays uninvolved with Ra none of the complicated transaction-based logic gets invoked. This could probably be eliminated by broadcasting the cluster's NQO and the identity of the system that led to the NQO, but there are some issues that surface when it comes time to break clusters into smaller pieces again. Tracking each resource seems like a small price to pay for something that we can see leads to the right NQO.

Unwinding from this state proceeds as in previous examples.

EXAMPLE 6

Three-Way Scenario with Breaking of a Cluster (3wayBreakClu)

This example is a three-system transitive closure case, where a large cluster is broken into smaller ones without any "end of contention" events to drive us. This example also shows a topology with multiple shared holders of a resource. Notation is as in Example 1.

The sequence of events, in time order, is as follows:

| Time (t) | Event |
|---|---|
| 1 | No contention. |
| 2 | Sy2: TxB acquires Ra shared. |
| 3 | Sy2: TxD acquires Ra shared. |
| 4 | Sy3: TxC acquires Rb. |
| 5 | Sy1: TxA requests Ra and is suspended since TxB holds it. |
| 6 | Sy2: TxB requests Rb and is suspended since TxC holds it. |
| 7 | Sy3: TxE requests Rb and is suspended since TxC holds it. |
| 8 | Sy3: TxC releases Rb. |
| 9 | Sy2: TxB acquires Rb. |
| 10 | Sy2: TxB finishes, releasing Ra and Rb. |
| 12 | Sy3: TxE acquires Rb. |
| 13 | Sy2: TxD releases Ra. |
| 14 | Sy1: TxA acquires Ra. |

The events that occur up through t=7 have been covered in earlier examples. As in the previous example, Sy3 has no involvement with Ra, yet it tracks at least some data about Ra.

Figure 7F:
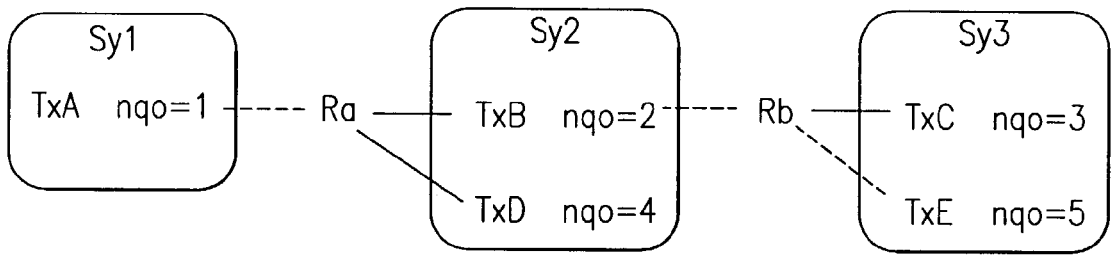

FIG. 7F shows the topology after t=7. The state data at this point is:

System Sy1

| Resource Cluster | Resource Name | Local system info | | Remote waiter info | | |
|---|---|---|---|---|---|---|
| | | Holders | Waiters | System name | NQO | NQO |
| Cab | Ra | TxA(1) | | | | 1 |
| Cab | Rb | | | Sy2 | 2 | 2 |
| | | | | Sy3 | 5 | |
| Cab | cluster | | | Sy2: Ra, Rb linked | | 1 |

System Sy2

| Resource Cluster | Resource Name | Local system info | | Remote waiter info | | |
|---|---|---|---|---|---|---|
| | | Holders | Waiters | System name | NQO | NQO |
| Cab | Ra | TxB(2), TxD(4) | | Sy1 | 1 | 1 |
| Cab | Rb | | TxB(2) | Sy3 | 5 | 2 |
| Cab | cluster | Ra, Rb linked | | | | 1 |

System Sy3

| Resource Cluster | Resource Name | Local system info | | Remote waiter info | | |
|---|---|---|---|---|---|---|
| | | Holders | Waiters | System name | NQO | NQO |
| Cab | Ra | | | Sy1 | 1 | 1 |
| Cab | Rb | TxC(3) | TxE(5) | Sy2 | 2 | 2 |
| Cab | cluster | | | Sy2: Ra, Rb linked | | 1 |

Figure 7G:
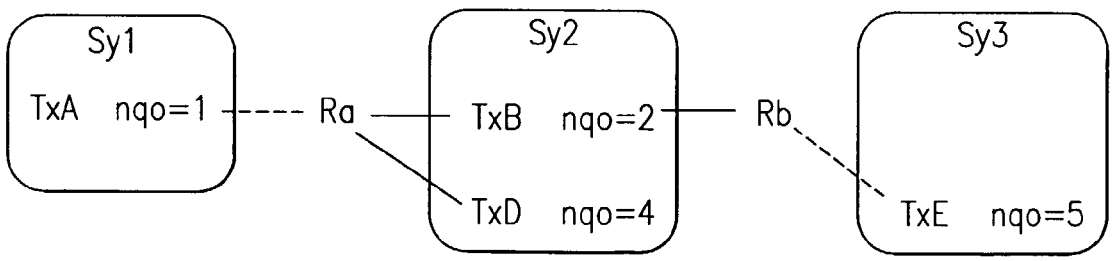

Unwinding from this state proceeds as in previous examples. This time, the events at t=8 and t=9 mean that the resource cluster Cab is no longer necessary, and per earlier examples the cluster will be broken in this case. So after t=9 we have the state shown in FIG. 7G and following tables:

System Sy1

| Resource Cluster | Resource Name | Local system info | | Remote waiter info | | |
|---|---|---|---|---|---|---|
| | | Holders | Waiters | System name | NQO | NQO |
| Ca | Ra | TxA(1) | | | | 1 |
| Cb | Rb | | | Sy3 | 5 | 5 |

System Sy2

| Resource Cluster | Resource Name | Local system info | | Remote waiter info | | |
|---|---|---|---|---|---|---|
| | | Holders | Waiters | System name | NQO | NQO |
| Ca | Ra | TxB(2), TxD(4) | | Sy1 | 1 | 1 |
| Cb | Rb | TxB(2) | | Sy3 | 5 | 5 |

System Sy3

| Resource Cluster | Resource Name | Local system info | | Remote waiter info | | |
|---|---|---|---|---|---|---|
| | | Holders | Waiters | System name | NQO | NQO |
| Ca | Ra | | | Sy1 | 1 | 1 |
| Cb | Rb | TxE(5) | | | | 5 |

As with the previous case where the resource cluster was broken without contention clearing for any of the resources involved, it can be seen that a single transaction (TxB here) can be involved with two distinct resource clusters simultaneously as long as it is either only holding or only waiting for resources under contention. As soon as it is waiting for any resource under contention, all of the resources under contention that it is either holding or waiting for must be managed as a single resource cluster.

Data Structures

FIGS. 8A–8H show one possible set of data structures for storing contention data in accordance with the present invention.

Figure 8A:
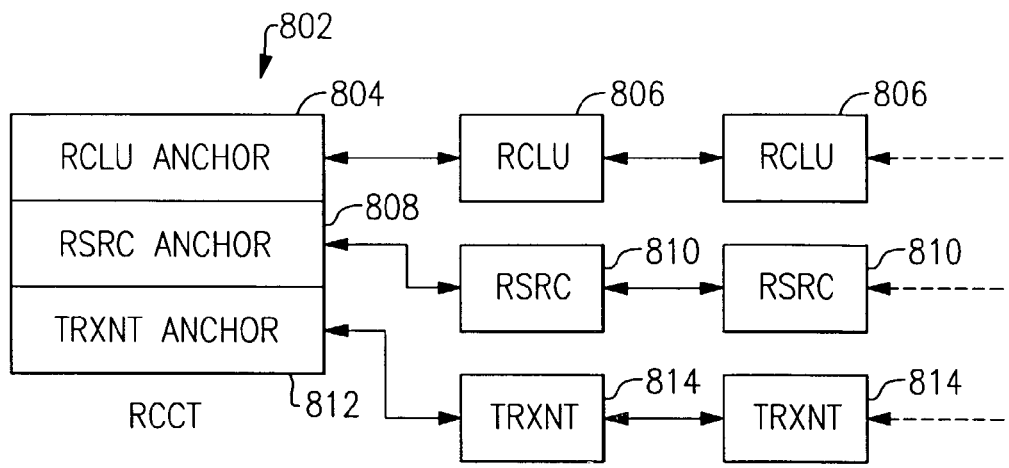

Referring to FIG. 8A, a resource contention control table (RCCT) 802 is used to anchor various items of interest only (or mainly) to a single WLM subcomponent. It contains:
1. An anchor 804 for resource cluster elements (RCLUs) 806 (FIG. 8B).
2. An anchor 808 for resource elements (RSRCs) 810 (FIG. 8C).
3. An anchor 812 for a transaction table (TRXNT) 814 (FIG. 8F).

Figure 8B:
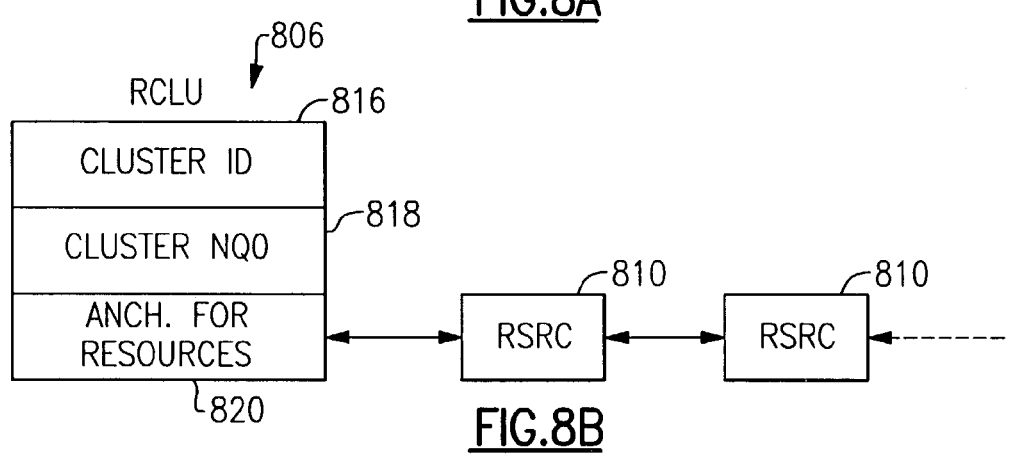

Referring to FIG. 8B, each resource cluster element (RCLU) 806 contains data related to a single resource cluster. It contains:
1. A cluster ID 816.
2. A cluster NQO 818 (the minimum of all resources in the cluster).
3. An anchor 820 for the resource elements (RSRCs) 810 (FIG. 8C) of the resources in the cluster.

Figure 8C:
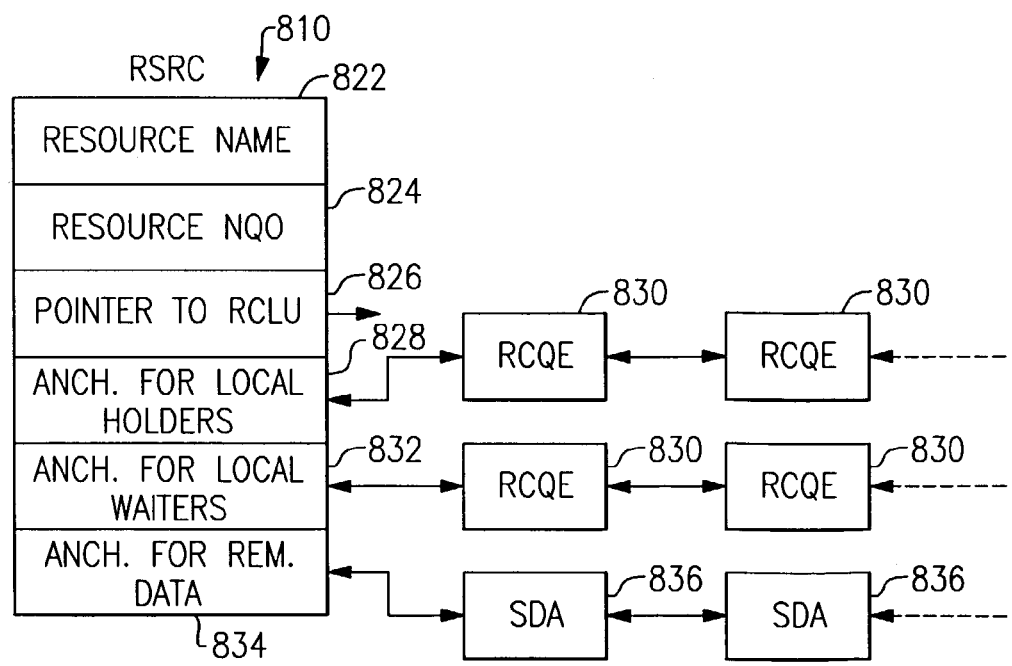

Referring to FIG. 8C, each resource element (RSRC) 810 describes a resource under contention.
It contains:
1. A resource fingerprint/name 822.
2. A resource NQO 824. (One might want to keep local/system cluster values separate for efficiency on the broadcast path; otherwise this is system cluster NQO.)
3. A pointer 826 to a cluster element (RCLU) 806 (FIG. 8B).
4. An anchor 828 for resource contention queue elements (RCQEs) 830 (FIG. 8H) for local holders.
5. An anchor 832 for resource contention queue elements (RCQEs) 830 for local waiters.
6. An anchor 834 for system data anchors (SDAs) 836 (FIG. 8D) for remote data about this resource.

Figure 8D:
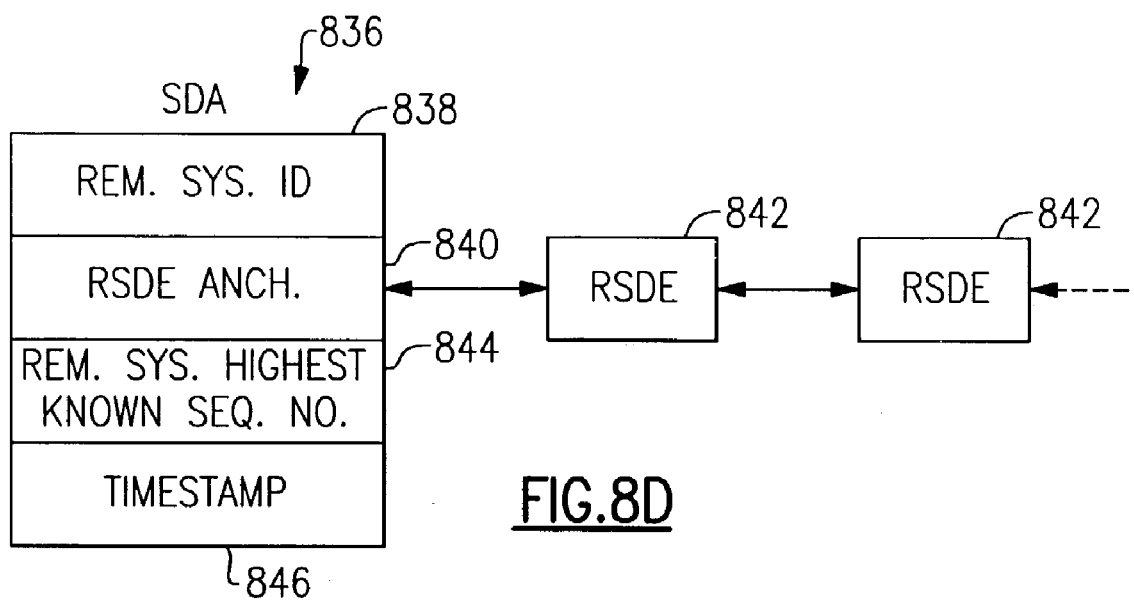

Referring to FIG. 8D, each system data anchor (SDA) 836 serves as an anchor for remote system information for a single system. It contains:
1. A remote system ID 838.
2. An anchor 840 for remote system data elements (RSDEs) 842 (FIG. 8E) from this system.
3. A value 844 representing the remote system's highest known sending sequence number. In other words, on the outbound path the sending system includes a value (like a timestamp) that is the same for each 'batch' of topology data. Each receiving system compares the value in incoming messages against this value; if the message has a lower value (implying it is stale because the receiving system has already received later data from the same sender) then the message is ignored.

Figure 8E:
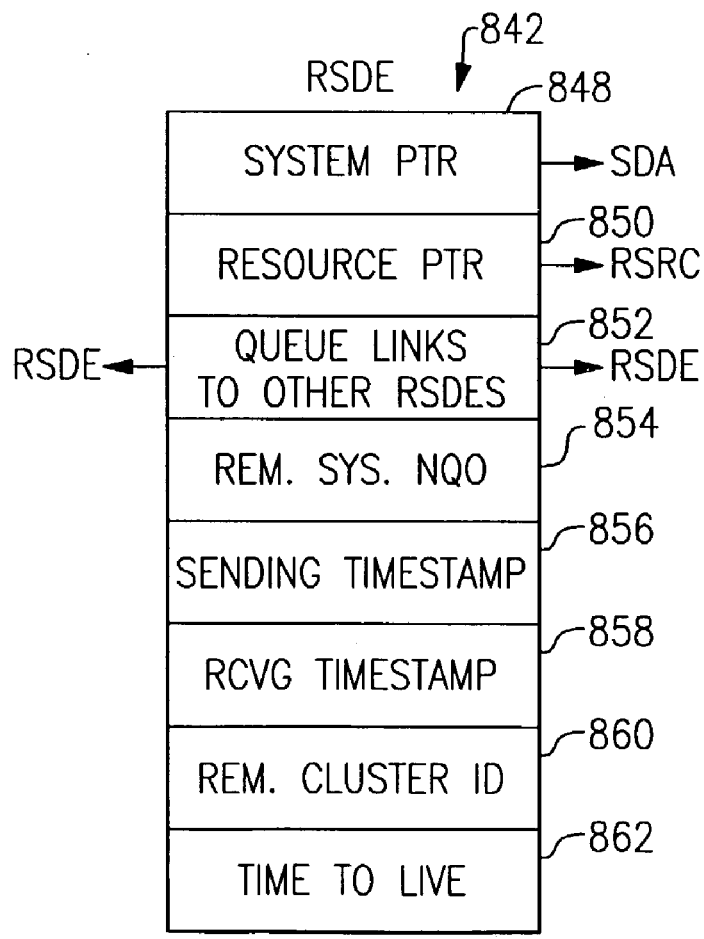

4. A timestamp 846, updated using the local clock when a topology message is received from the remote system. Referring to FIG. 8E, each resource system data element (RSDE) 842 contains remote system information for a resource. It contains:
1. A pointer 848 to the system data anchor (SDA) (FIG. 8D) for the system.
2. A pointer 850 to the resource element (RSRC) 810 (FIG. 8C) for the resource.
3. Queue links 852 for other RSDEs 842 for the same resource.
4. The remote system's NQO 854, considering only waiters on the remote system.
5. A sending timestamp 856 (the clock value on the remote system when sent), for debug only.
6. A timestamp 858 representing the local clock value when received, for debug and TTL processing.
7. A remote cluster ID 860 for this resource. If the remote system had a transaction that was both a holder and a waiter, all resources involved will have the same cluster ID there and need to be in the same cluster here. If remote data from different systems disagrees about which resources belong to a cluster, the clusters are unioned locally.
8. A time to live (TTL) duration 862 supplied by the remote system, corresponding to how often the remote system plans to send data plus a bit extra. If the local time is greater than the receipt timestamp plus this value, the element is eligible for deletion.

Referring to FIG. 8F, transaction table (TRXNT) 814 is used to anchor various items of interest only (or mainly) to a single WLM subcomponent. It contains:
1. The number 864 of address spaces when the transaction table 814 was built.
2. The number 866 of enclaves when the transaction table 814 was built.
3. The offset 868 from the start of the transaction table to a first table entry 868.
4. An area 870 for entries (TRXNEs) (up to the number 864) for transactions that are address spaces.
5. An area 872 for entries (TRXNEs) (up to the number 866) for transactions that are enclaves.

Referring to FIG. 8G, each entry (TRXNE) 874 in area 870 or 872 of transaction table (TRXNT) 814 contains information about a single transaction that is involved with at least one resource whose contention is being managed by WLM. It contains:
1. A type 876: address space or enclave.
2. An address space ID (ASID) or enclave ID 878 for this transaction.
3. An address space or enclave token 880 for this transaction. ASIDs and enclave IDs are reusable; the tokens provide uniqueness within a single image even if the IDs are reused.
4. An anchor 882 for a queue 884 of contention elements (RCQEs) 830 (FIG. 8H) for resources held by this transaction.
5. An anchor 886 for a queue 888 of contention elements (RCQEs) 830 for resources waited for by this transaction.
6. The NQO 888 of this transaction.

Referring to FIG. 8H, each resource contention queue element (RCQE) 830 relates a transaction (holder or waiter) to a resource. It contains:
1. The offset 892 of the TRXNE 874 for the transaction in TRXNT 810.
2. Queue links 894 for next/previous RCQE 830 for this transaction.
3. A pointer 896 to the resource element (RSRC) 810 for the resource.
4. Queue links 898 for next/previous RCQE 830 for this resource.
5. A hold/wait bit 899 (probably only for queue verification).

Figure 9:
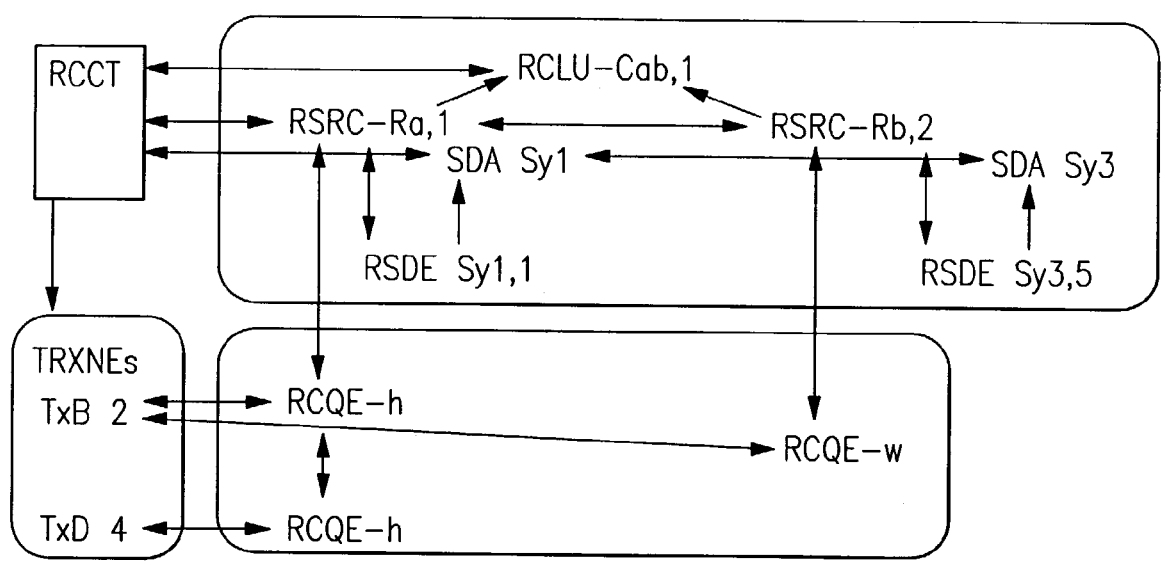
FIG. 9 shows how the contention scenario shown in FIG. 4 is captured by one of the systems of the cluster.

FIG. 9 shows how the contention scenario shown in FIG. 4 and summarized for Sy2 in the table accompanying the FIG. 4 description is captured by the various data structures shown in FIGS. 8A–3H.

While a particular embodiment has been shown and described, Various modifications will be apparent to those skilled in the art. Thus, rather than sending out a common cluster ID for all resources believed be part of a common cluster (on the basis of either local or remote contention data), a local system could instead use a common cluster ID only for those resources known to belong to a common cluster on the basis of local contention data. Still other variations will be apparent to those skilled in the art.

What is claimed is:

1. A method for managing contention among users for access to one or more serialized resources in a system cluster containing a plurality of systems, each of said users having an assigned need that is independent of any contention of the user for a serialized resource and being capable of being either a holder or a waiter for a serialized resource it is seeking to access, said method being performed on at least one of said systems as a local system and comprising the steps of:

storing local cluster data indicating a grouping of said serialized resources into one or more local clusters on the basis of contention on said local system and indicating for each of said local clusters the assigned need of a waiter for one or more serialized resources in said local cluster;

receiving remote cluster data from another system in said system cluster as a remote system indicating a grouping of said serialized resources into one or more remote clusters on the basis of contention on said remote system and indicating for each of said remote clusters the assigned need of a waiter for one or more serialized resources in said remote cluster;

combining said local cluster data and said remote cluster data to generate composite cluster data indicating a grouping of said serialized resources into one or more composite clusters on the basis of contention across said systems and indicating for each of said composite clusters the assigned need of a waiter for one or more serialized resources in that composite cluster; and managing a holder on said local system of a serialized resource in one of said composite clusters in accordance with the composite cluster data for said cluster including said assigned need of said waiter for one or more serialized resources in that composite cluster.

2. The method of claim 1 in which said need for one or more serialized resource in any of said clusters is the need of a neediest waiter for any serialized resource in the cluster.

3. The method of claim 1 in which said managing step comprises the steps of:

identifying a holder on said local system of a serialized resource in one of said composite clusters that is not waiting for any other serialized resource; and allocating system resources to said holder of said serialized resource on said local system as if its need were at least that of a neediest waiter for any serialized resource in said composite cluster.

4. The method of claim 1 in which said receiving step is performed for each of a plurality of other systems in said system cluster as remote systems.

5. The method of claim 1 in which said local system assigns a pair of serialized resources to a common local cluster if a user on said local system is holding one of the serialized resources while waiting for the other of the serialized resources.

6. The method of claim 1 in which said local system updates said local cluster data in response to receiving a notification of a change in the contention status of a serialized resource with regard to a user on said local system.

7. The method of claim 6 in which said local system transmits the updated local cluster data to said remote system.

8. The method of claim 1 in which said local system updates said composite cluster data upon receiving remote cluster data from said remote system.

9. The method of claim 1 in which said local system transmits local cluster data to said remote system.

10. The method of claim 9 in which the transmitted local cluster data indicates a serialized resource, a cluster to which the serialized resource is assigned on the basis of contention on the local system, and the assigned need of a waiter on said local system for said serialized resource.

11. Apparatus for managing contention among users for access to one or more serialized resources in a system cluster containing a plurality of systems, each of said users having an assigned need that is independent of any contention of the user for a serialized resource and being capable of being either a holder or a waiter for a serialized resource it is seeking to access, said apparatus being associated with at least one of said systems as a local system and comprising:

logic for storing local cluster data indicating a grouping of said serialized resources into one or more local clusters on the basis of contention on said local system and indicating for each of said local clusters the assigned need of a waiter for one or more serialized resources in said local cluster;

logic for receiving remote cluster data from another system in said system cluster as a remote system indicating a grouping of said serialized resources into one or more remote clusters on the basis of contention on said remote system and indicating for each of said remote clusters the assigned need of a waiter for one or more serialized resources in said remote cluster;

logic for combining said local cluster data and said remote cluster data to generate composite cluster data indicating a grouping of said serialized resources into one or more composite clusters on the basis of contention across said systems and indicating for each of said composite clusters the assigned need of waiter for one or more serialized resources in that composite cluster; and logic for managing a holder on said local system of a serialized resource in one of said composite clusters in accordance with the composite cluster data for said cluster including said assigned need of said waiter for one or more serialized resources in that composite cluster.

12. The apparatus of claim 11 in which said managing logic comprises:

logic for identifying a holder on said local system of a serialized resource in one of said composite clusters that is not waiting for any other serialized resource; and logic for allocating system resources to said holder of said serialized resource on said local system as if its need were at least that of a neediest waiter for any serialized resource in said composite cluster.

13. The apparatus of claim 11 in which said local system assigns a pair of serialized resources to a common local cluster if a user on said local system is holding one of the serialized resources while waiting for the other of the serialized resources.

14. The apparatus of claim 11 in which said local system updates said local cluster data and transmits the updated local cluster data to said remote system in response to receiving a notification of a change in the contention status of a serialized resource with regard to a user on said local system.

15. The apparatus of claim 11 in which said local system transmits local cluster data to said remote system, the transmitted local cluster data indicating a serialized resource, a cluster to which the serialized resource is assigned on the basis of contention on the local system, and the assigned need of a waiter on said local system for said serialized resource.

16. A program storage device readable by a machine, tangibly embodying a program of instructions executable by the machine to perform method steps for managing contention among users for access to one or more serialized resources in a system cluster containing a plurality of systems, each of said users having an assigned need that is independent of any contention of the user for a serialized resource and being capable of being either a holder or a waiter for a serialized resource it is seeking to access, said method steps being performed on one of said systems as a local system and comprising:

storing local cluster data indicating a grouping of said serialized resources into one or more local clusters on the basis of contention on said local system and indicating for each of said local clusters the assigned need of a waiter for one or more serialized resources in said local cluster;

receiving remote cluster data from another system in said system cluster as a remote system indicating a grouping of said serialized resources into one or more remote clusters on the basis of contention on said remote system and indicating for each of said remote clusters the assigned need of a waiter for one or more serialized resources in said remote cluster;

combining said local cluster data and said remote cluster data to generate composite cluster data indicating a grouping of said serialized resources into one or more composite clusters on the basis of contention across said systems and indicating for each of said composite clusters the assigned need of a waiter for one or more serialized resources in that composite cluster; and managing a holder on said local system of a serialized resource in one of said composite clusters in accordance with the composite cluster data for said cluster including said assigned need of said waiter for one or more serialized resource in that composite cluster.

17. The program storage device of claim 16 in which said managing step comprises the steps of:

identifying a holder on said local system of a serialized resource in one of said composite clusters that is not waiting for any other serialized resource; and allocating system resources to said holder of said serialized resource on said local system as if its need were at least that of a neediest waiter for any serialized resource in said composite cluster.

18. The program storage device of claim 16 in which said local system assigns a pair of serialized resources to a common local cluster if a user on said local system is holding one of the serialized resources while waiting for the other of the serialized resources.

19. The program storage device of claim 16 in which said local system updates said local cluster data and transmits the updated local cluster data to said remote system in response to receiving a notification of a change in the contention status of a serialized resource with regard to a user on said local system.

20. The program storage device of claim 16 in which said local system transmits local cluster data to said remote system, the transmitted local cluster data indicating a serialized resource, a cluster to which the serialized resource is assigned on the basis of contention on the local system, and the assigned need of a waiter on said local system for said serialized resource.

* * * * *